(12) United States Patent
Takeda et al.

(10) Patent No.: US 8,022,829 B2
(45) Date of Patent: Sep. 20, 2011

(54) RFID-TAG STRUCTURE BODY, RFID LABEL, AND APPARATUS FOR PRODUCING RFID LABELS

(75) Inventors: Michihiro Takeda, Kiyosu (JP); Katsumi Toda, Toyota (JP); Tomoyasu Fukui, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 312 days.

(21) Appl. No.: 12/189,751

(22) Filed: Aug. 11, 2008

(65) Prior Publication Data

US 2009/0045964 A1 Feb. 19, 2009

Related U.S. Application Data

(63) Continuation-in-part of application No. PCT/JP2007/052316, filed on Feb. 9, 2007.

(30) Foreign Application Priority Data

Feb. 9, 2006 (JP) .................................. 2006-032675
Feb. 16, 2006 (JP) .................................. 2006-038915

(51) Int. Cl.
*G08B 13/14* (2006.01)
(52) U.S. Cl. .................................. 340/572.8; 340/572.7
(58) Field of Classification Search ............... 340/572.8, 340/572.7, 10.1, 572.3
See application file for complete search history.

(56) References Cited

U.S. PATENT DOCUMENTS 7,119,684 B2 * 10/2006 Petersen et al. ............ 340/572.8
7,436,309 B2 * 10/2008 Koele ......................... 340/572.7

FOREIGN PATENT DOCUMENTS

| JP | H07-015354 U | 3/1995 |
| JP | 2001-143029 A | 5/2001 |
| JP | 2003-223627 A | 8/2003 |
| JP | 2004-164055 A | 6/2004 |
| JP | 2004-260586 A | 9/2004 |
| JP | 2005-137486 A | 6/2005 |
| JP | 2005-149427 A | 6/2005 |
| JP | 2005-196377 A | 7/2005 |
| JP | 2006-007610 A | 1/2006 |

OTHER PUBLICATIONS

The International Bureau of WIPO, International Preliminary Report on Patentability for International Application No. PCT/JP2007/052316 (counterpart to above-captioned patent application), dated Aug. 21, 2008.
Japan Patent Office, Notice of Reasons for Rejection for Japanese Patent Application No. 2006-032675 (counterpart to above-captioned patent application), mailed Jan. 31, 2011.
Japan Patent Office, Notice of Reasons for Rejection for Japanese Patent Application No. 2006-038915 (counterpart to above-captioned patent application), mailed Jan. 26, 2011.

* cited by examiner

*Primary Examiner* — John A Tweel, Jr.
(74) *Attorney, Agent, or Firm* — Baker Botts L.L.P.

(57) ABSTRACT

This disclosure discloses a RFID-tag structure body comprising an affixed portion to be affixed onto an affixed face; a self-supporting portion self-supported with respect to the affixed face; at least one RFID circuit element having an IC circuit part provided at the self-supporting portion and configured to store information, and a tag antenna connected to the IC circuit part; and a stereo-structure preparation portion configured to realize a three-dimensional structure when being affixed onto the affixed face.

23 Claims, 22 Drawing Sheets

[FIG. 1]
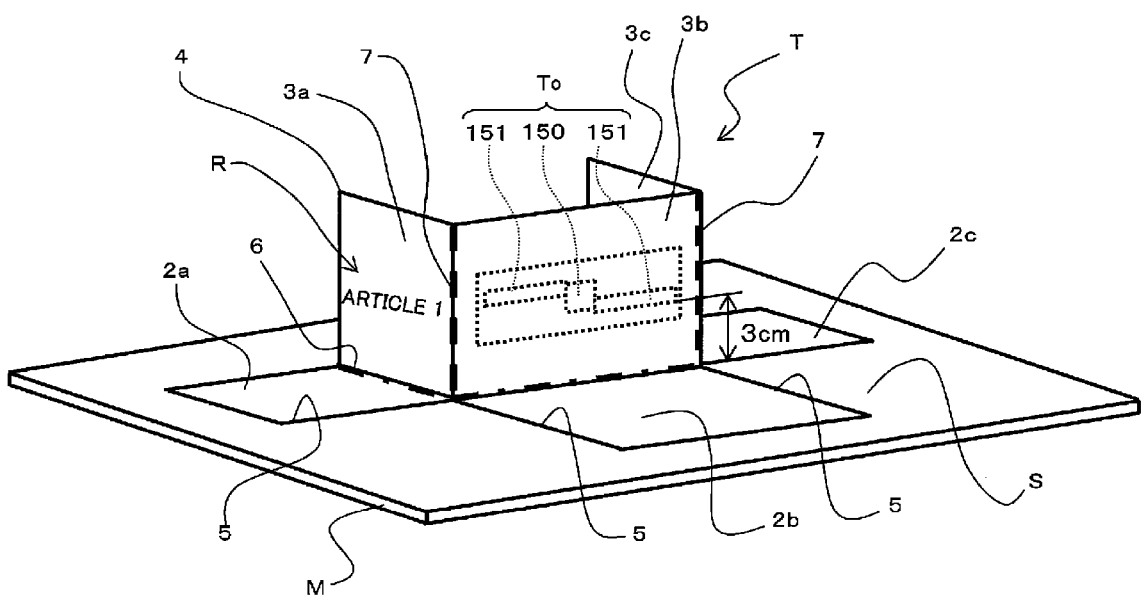

[FIG. 2]
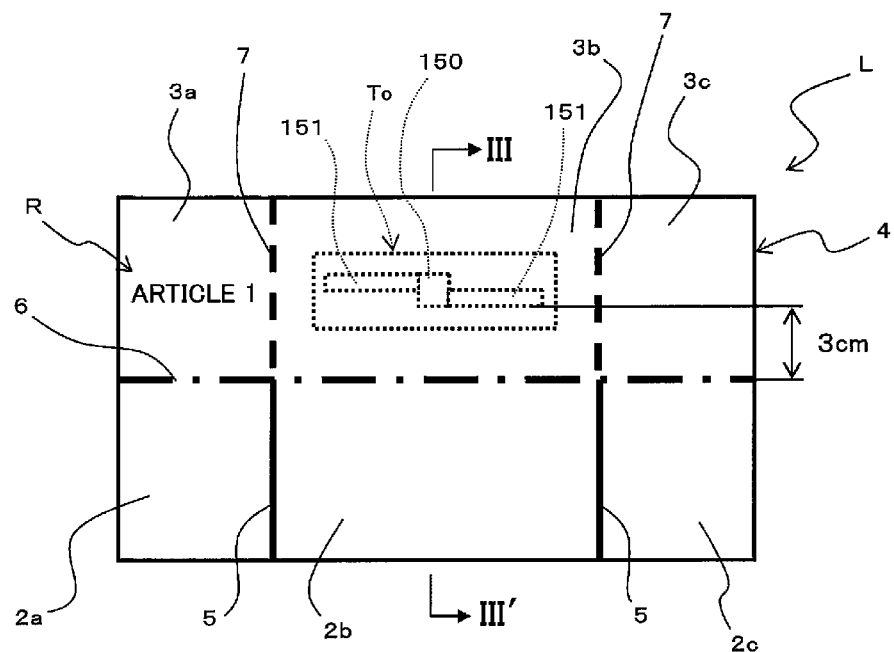
MOUNTAIN FOLDING       VALLEY FOLDING
[FIG. 3]
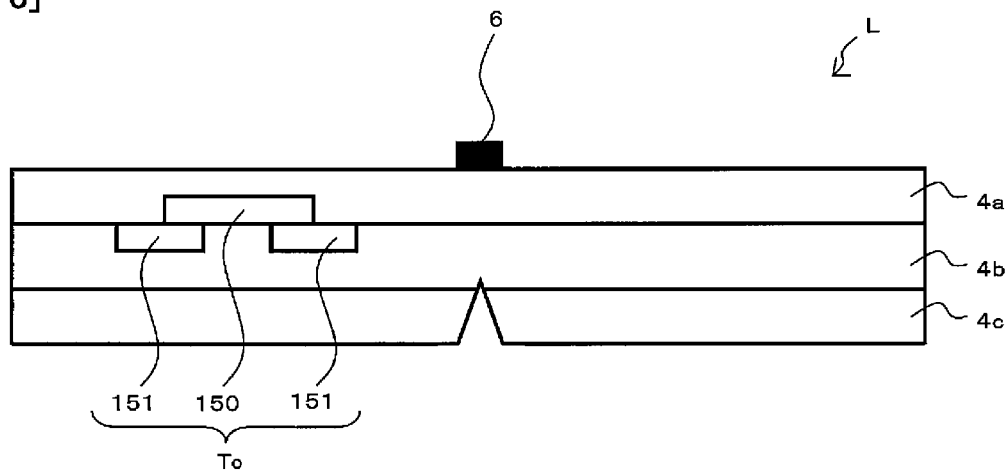

[FIG. 4]
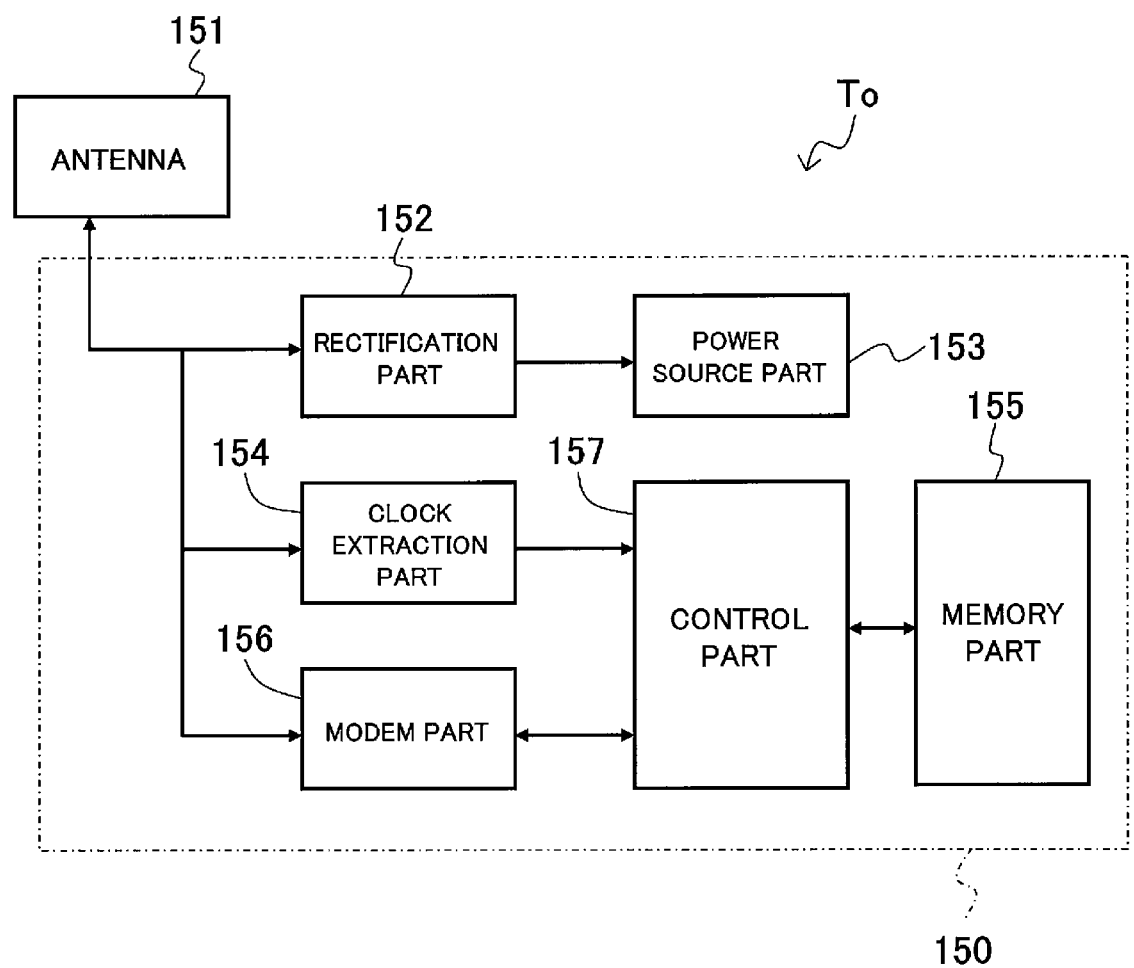

[FIG. 5]
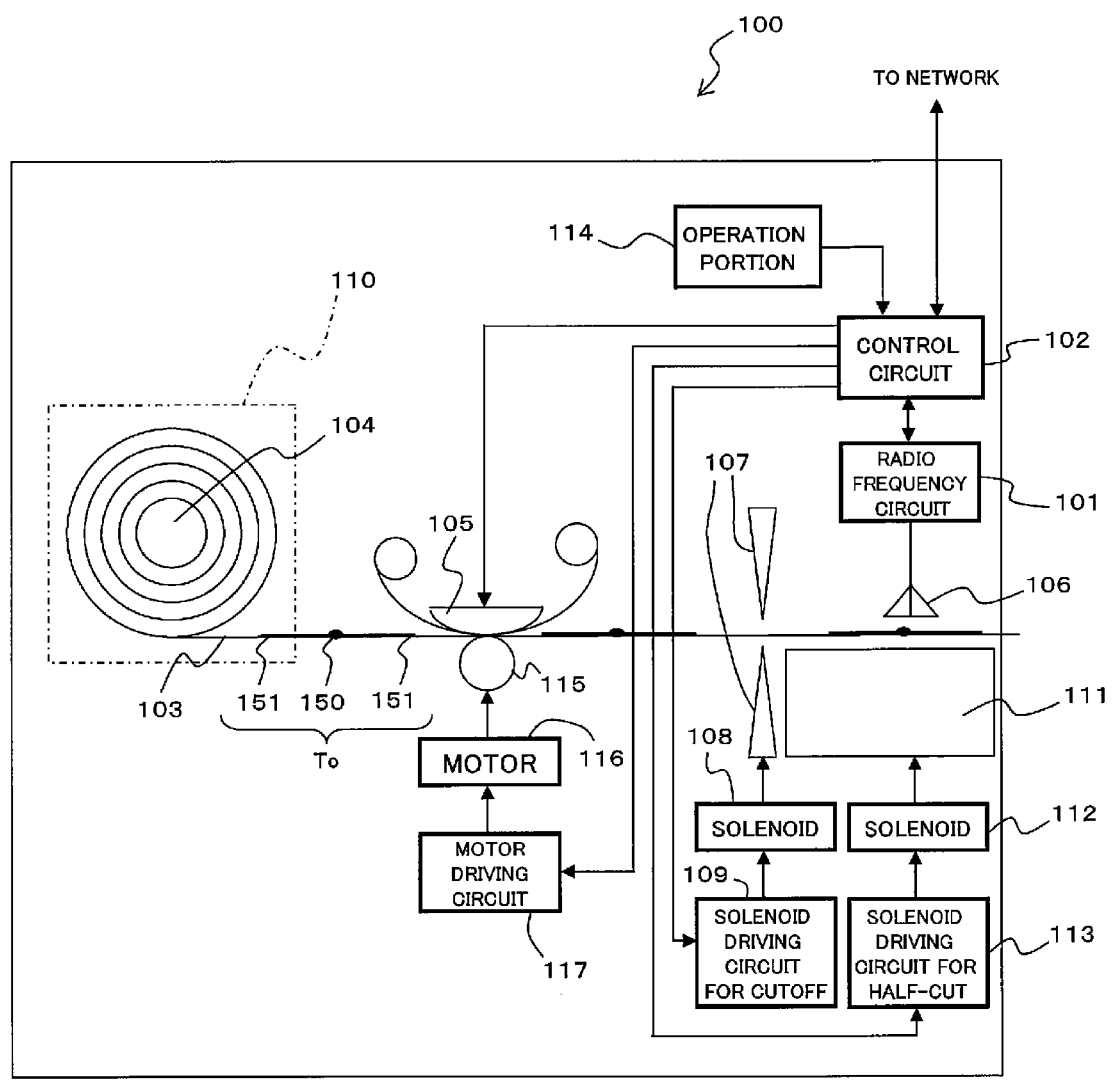

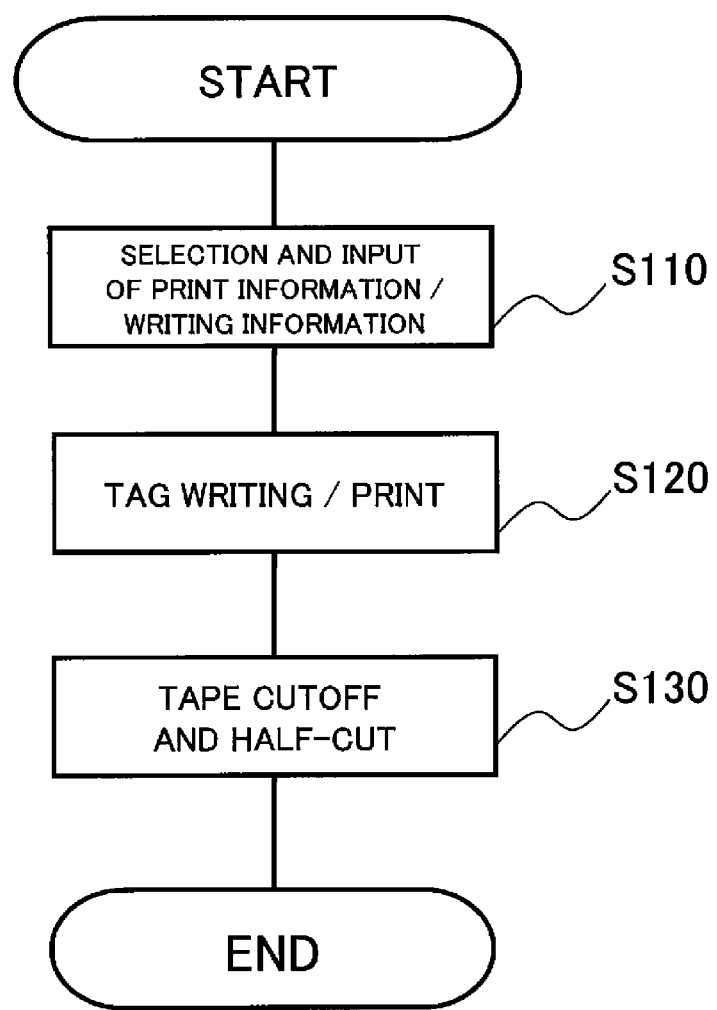
[FIG. 6]

[FIG. 7]
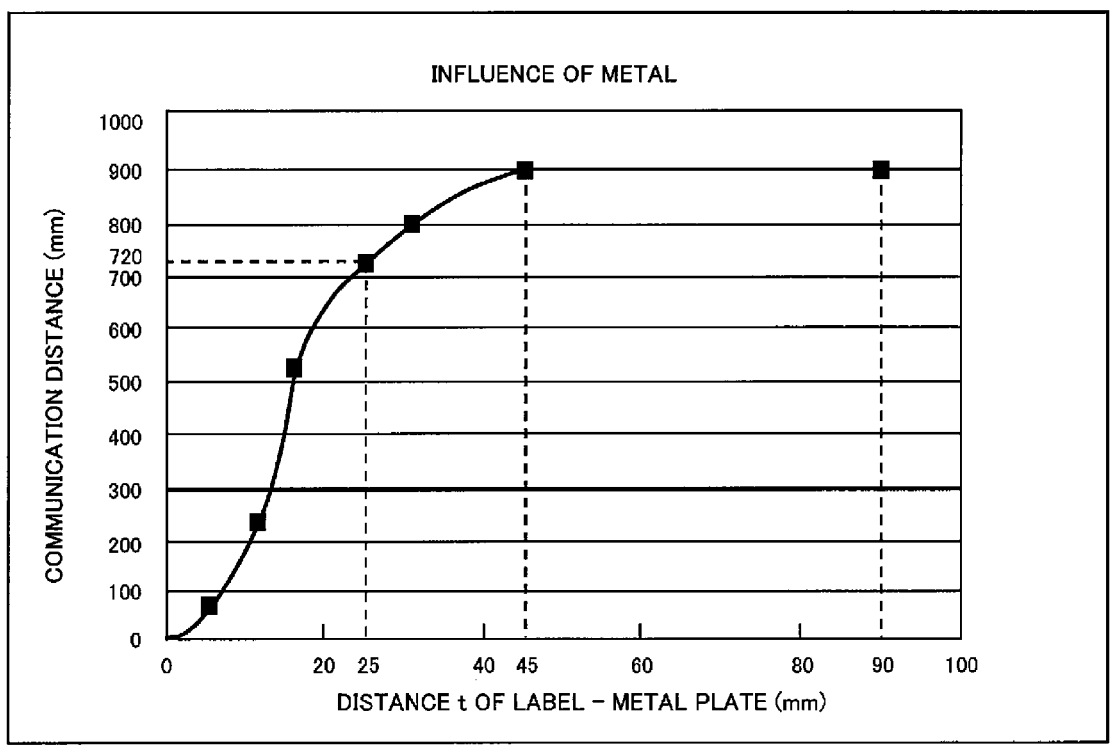

[FIG. 8]
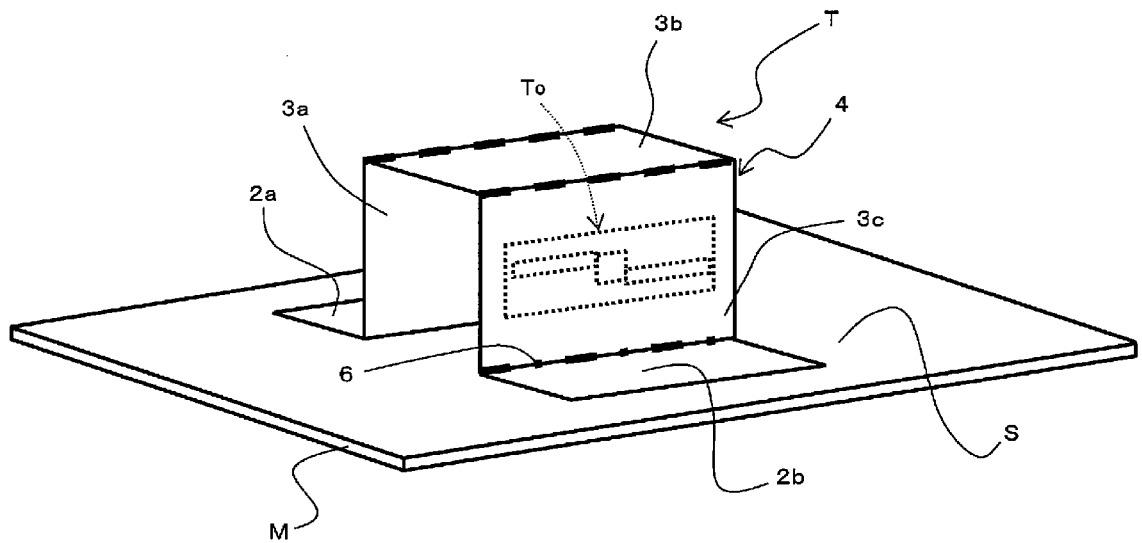
[FIG. 9]
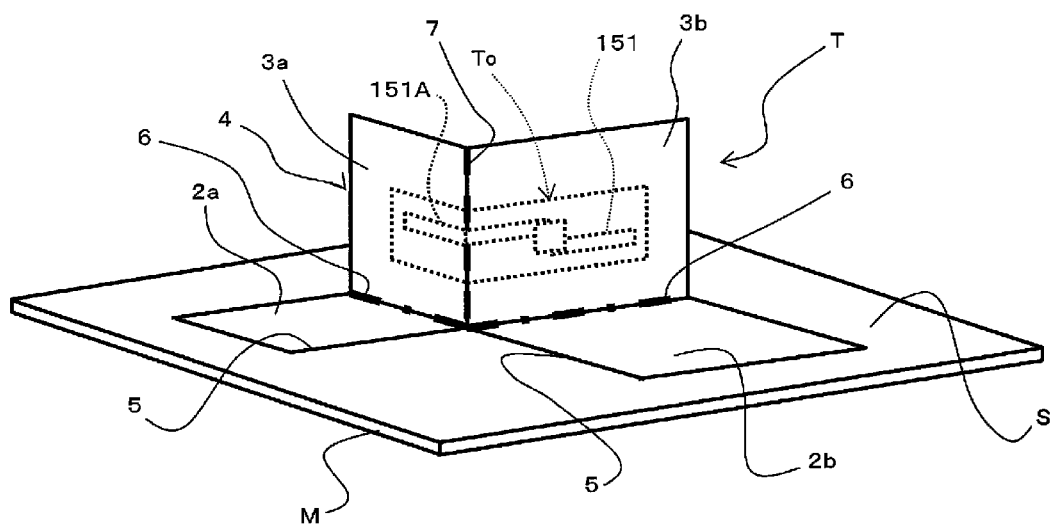

[FIG. 10]
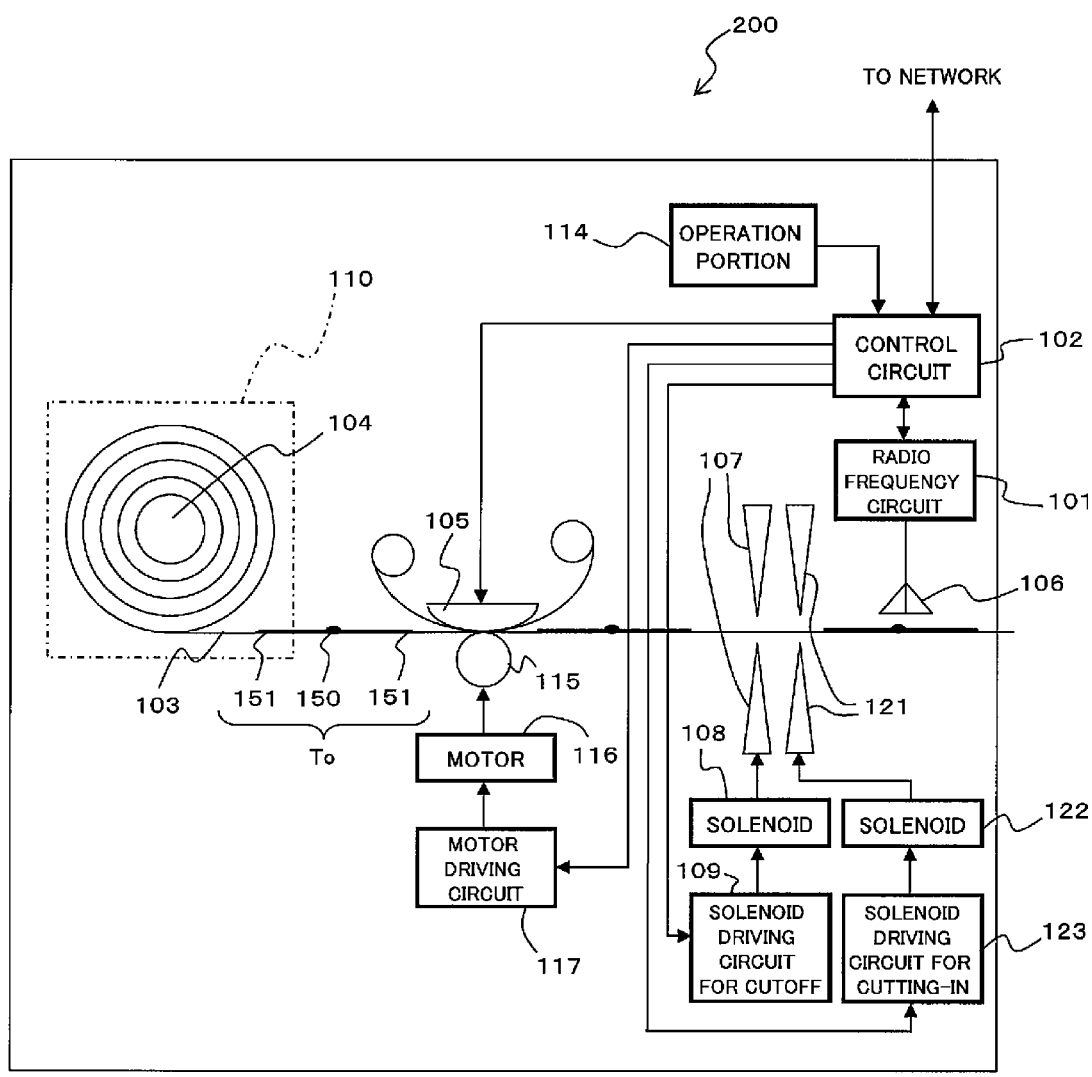

[FIG. 11]
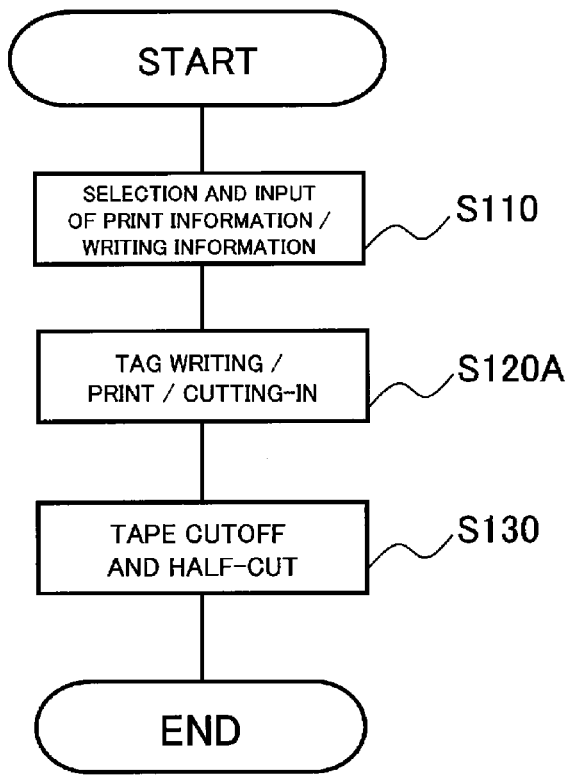
[FIG. 12]
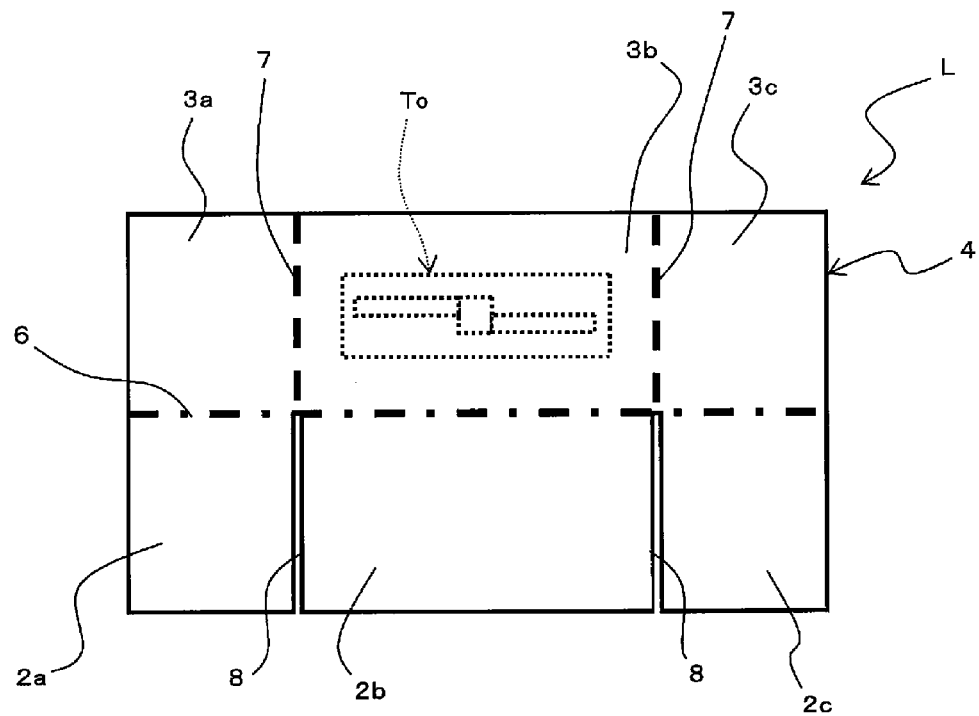

[FIG. 13]
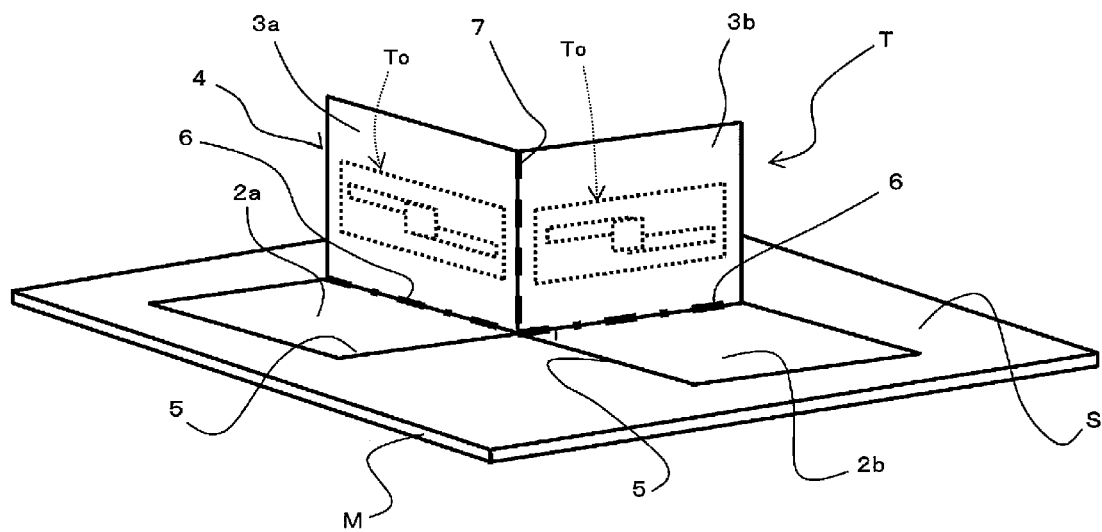
[FIG. 14]
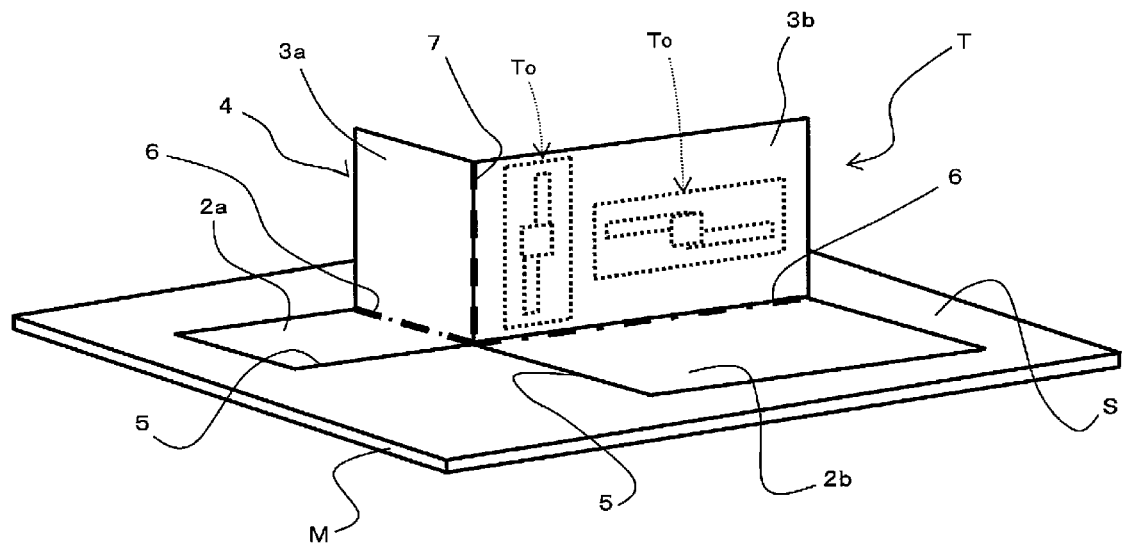

[FIG. 15]
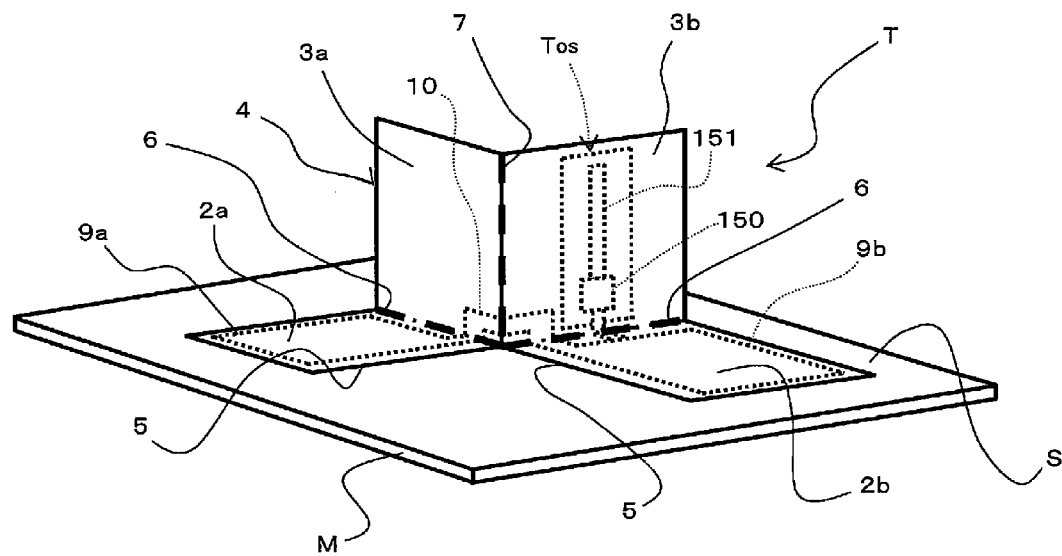
[FIG. 16]
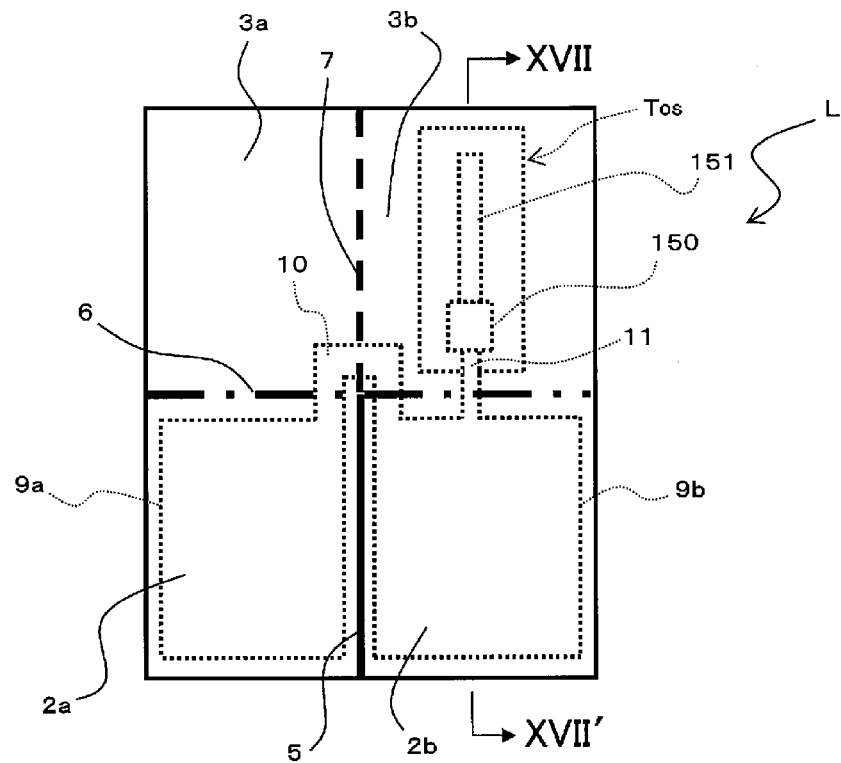

[FIG. 17]
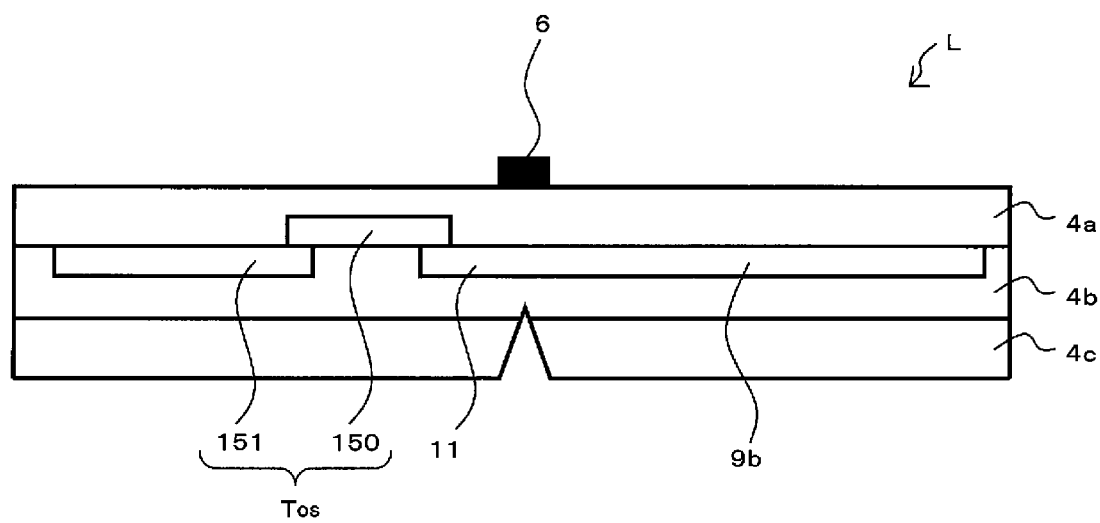

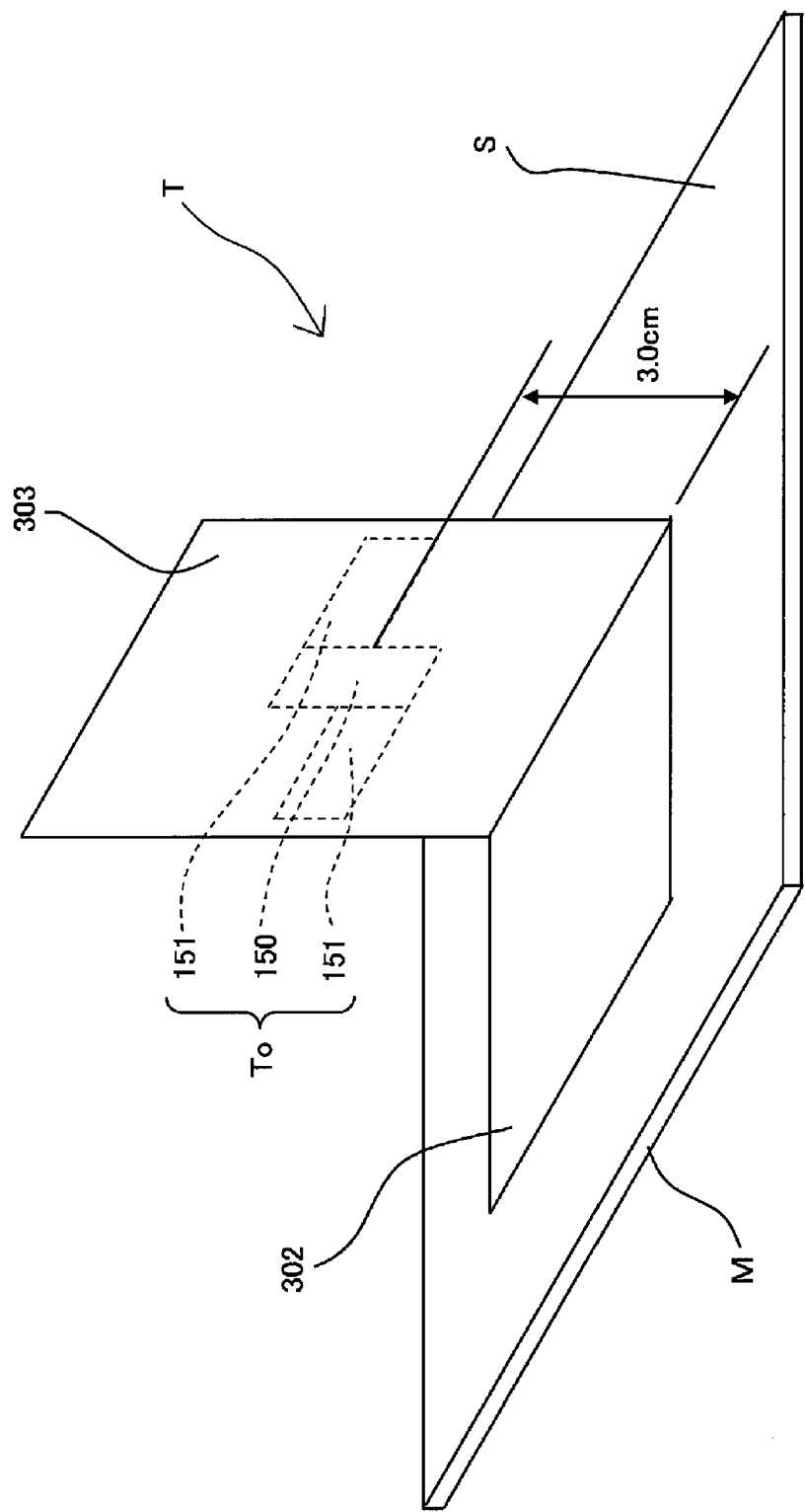
[FIG. 18]

[FIG. 19]
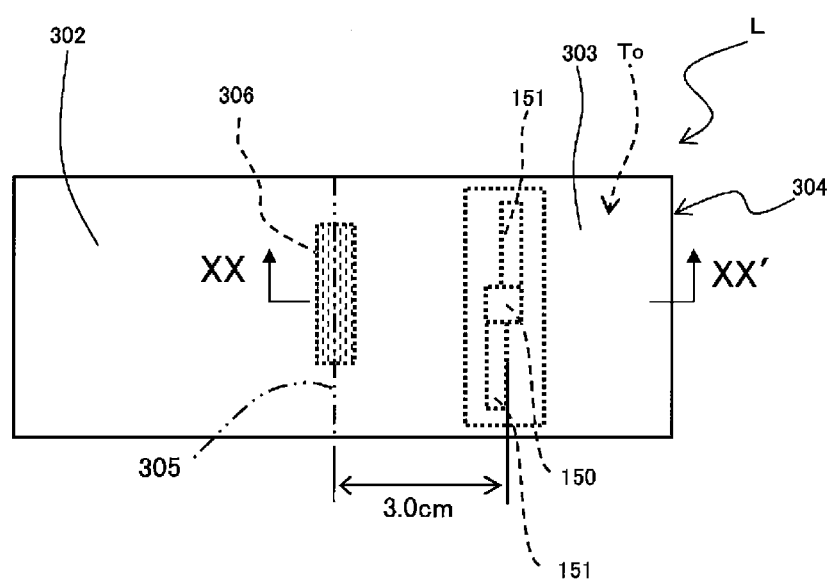

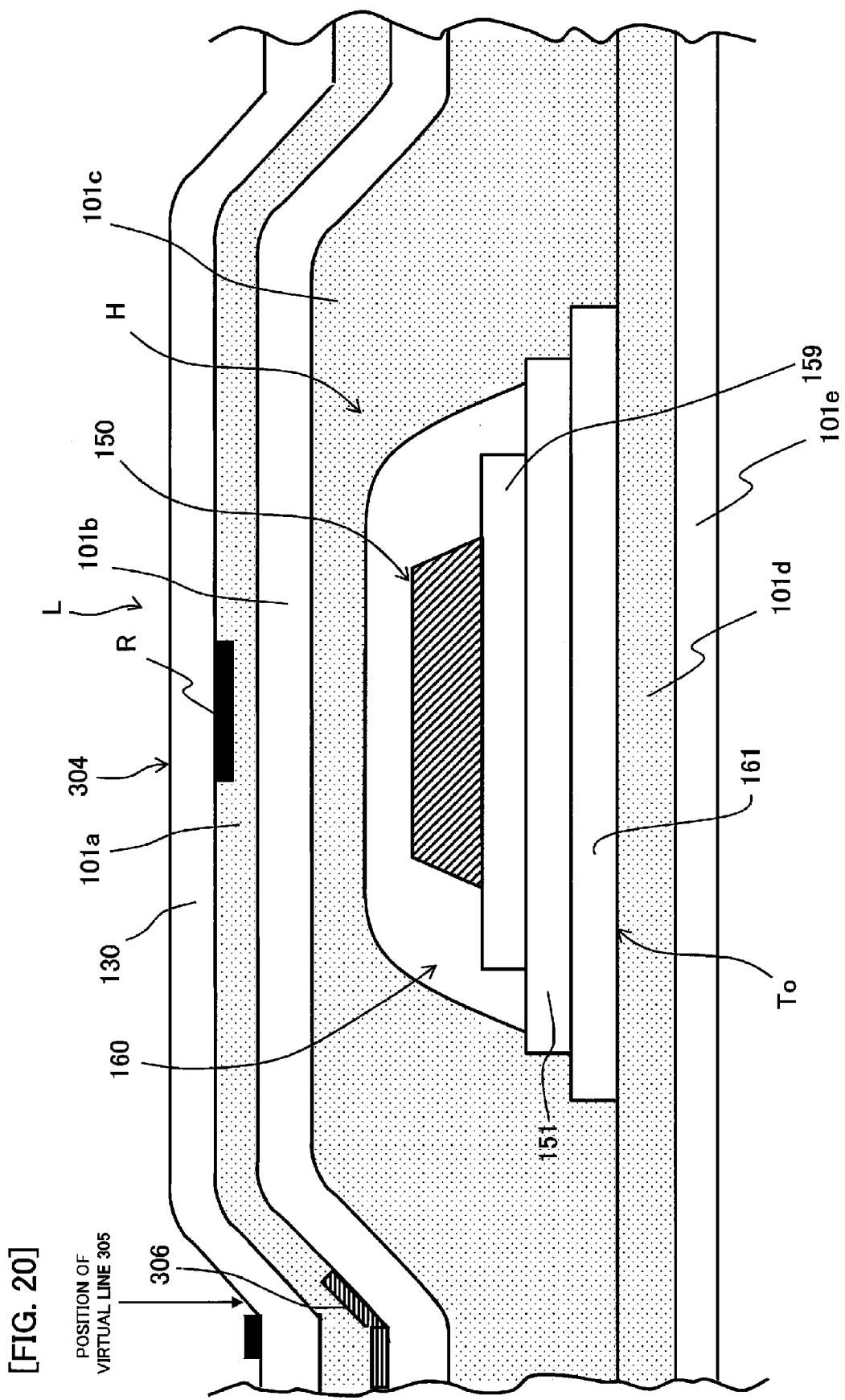

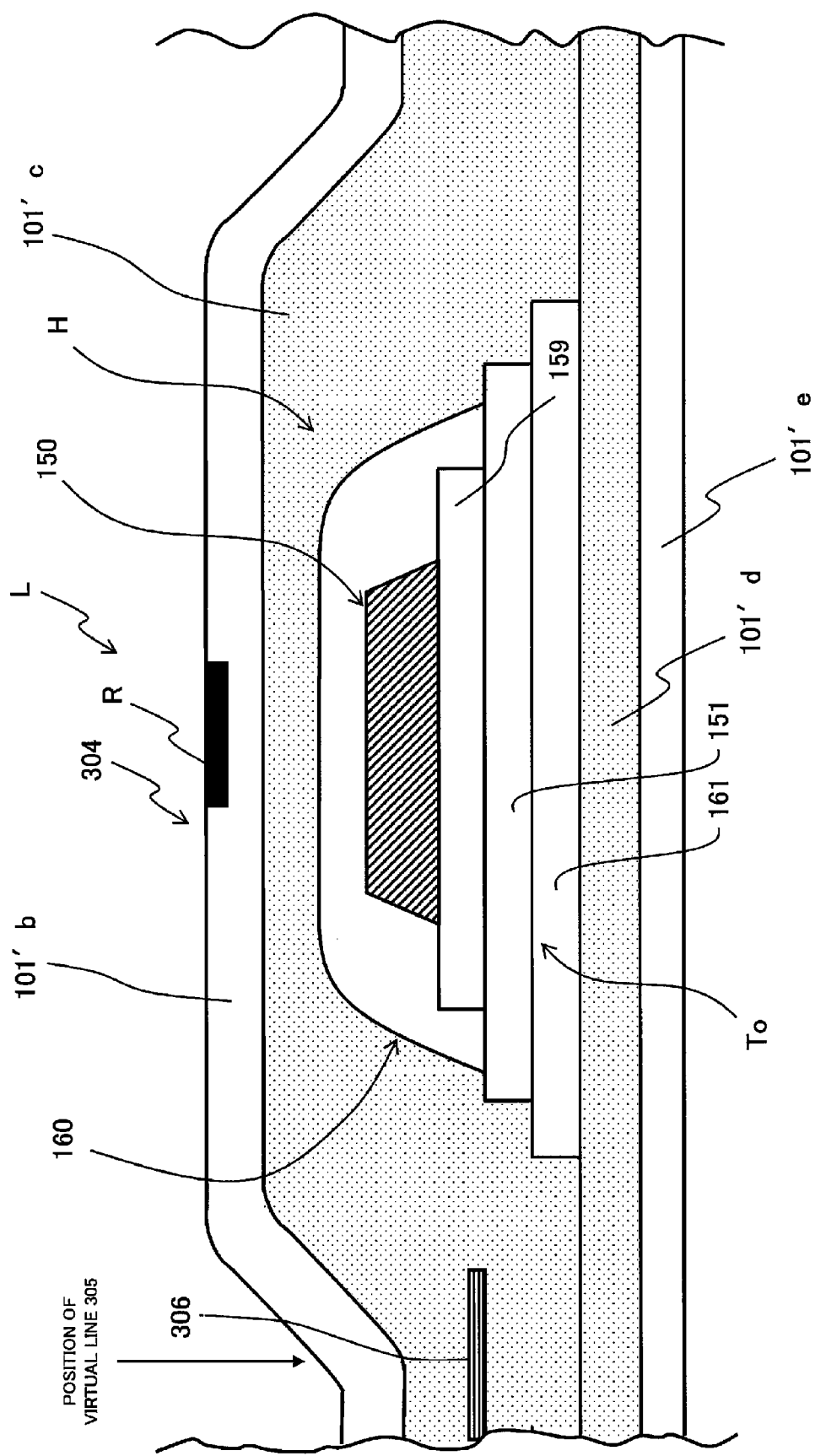

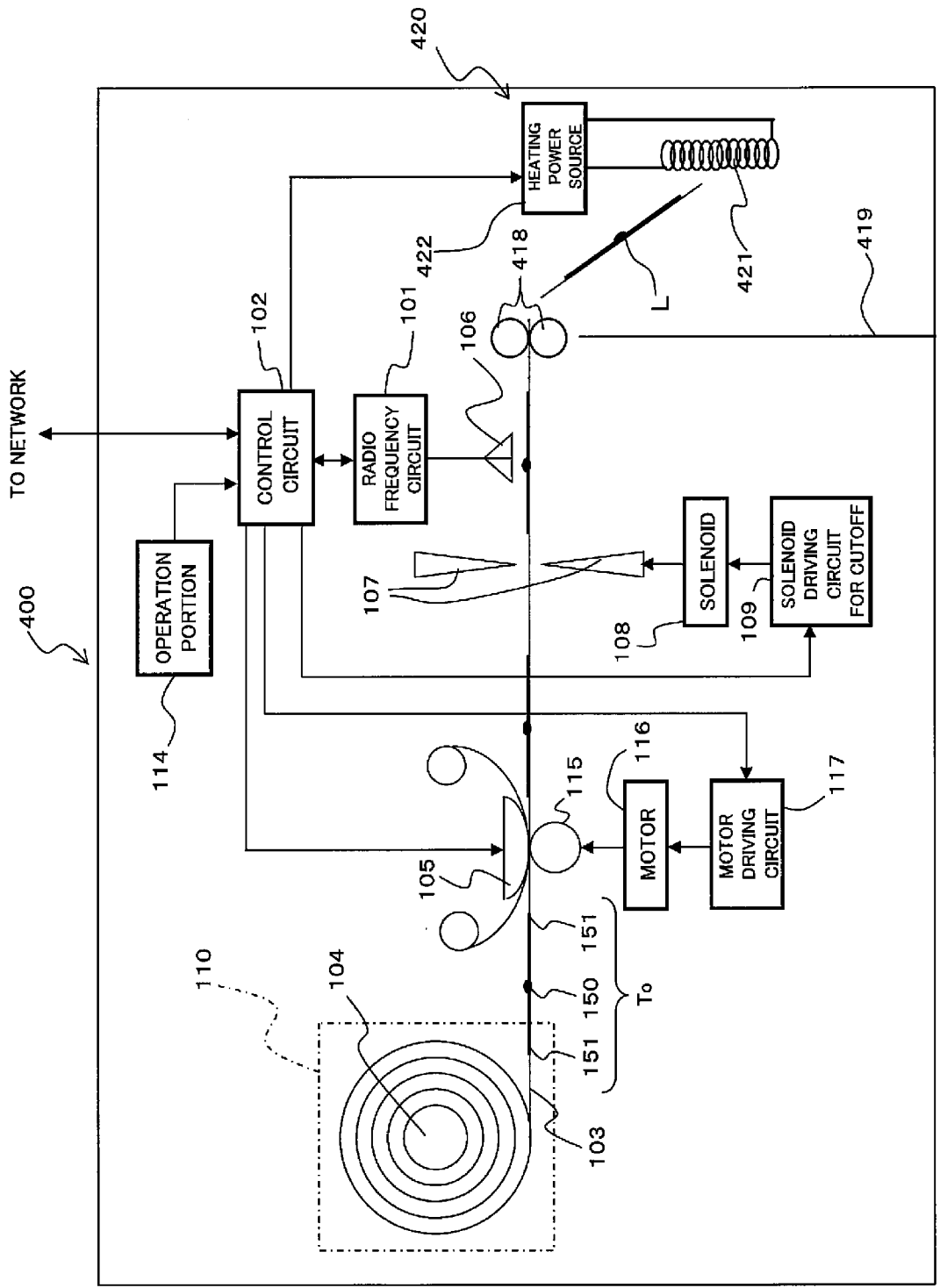
[FIG. 22]

[FIG. 23]
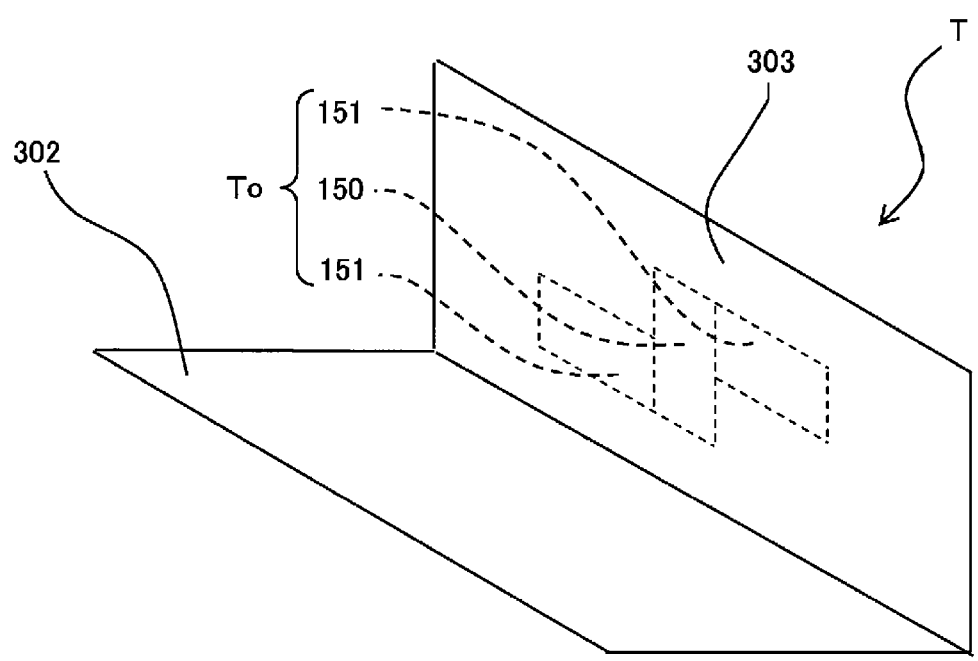

[FIG. 24A]
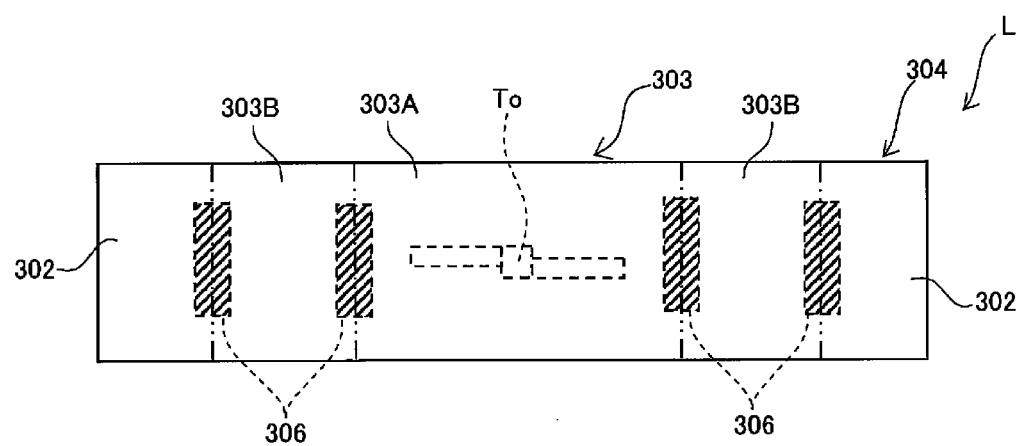
[FIG. 24B]
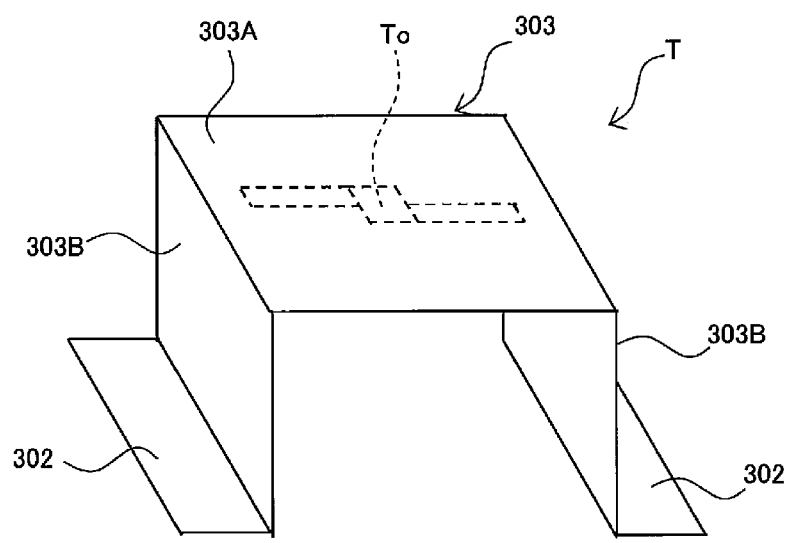

[FIG. 25A]
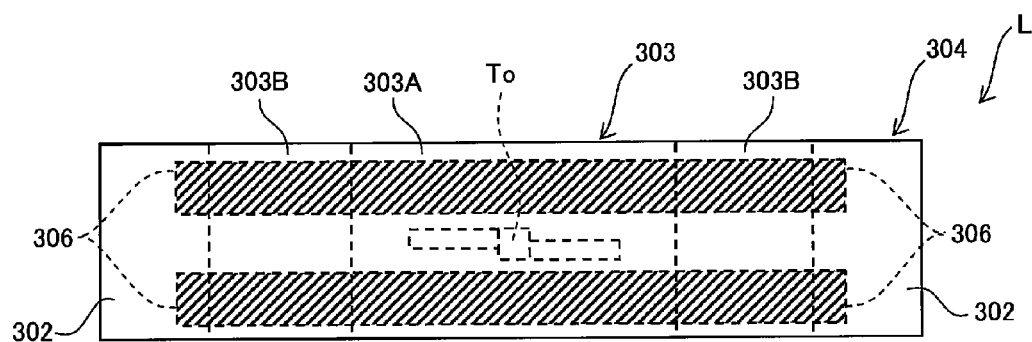
[FIG. 25B]
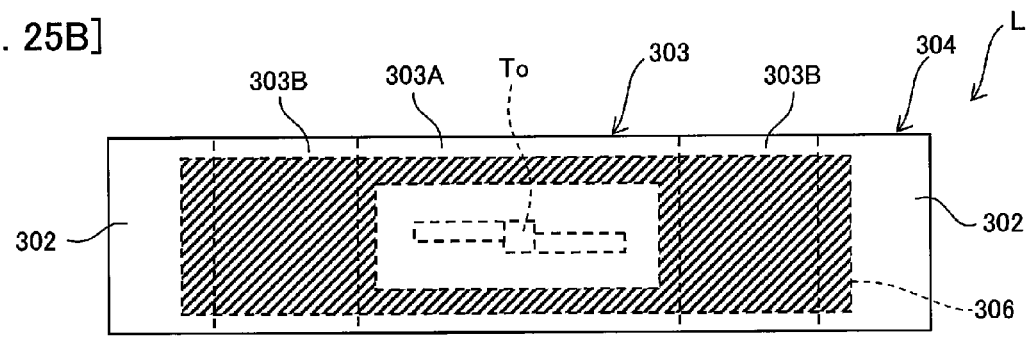

[FIG. 26A]
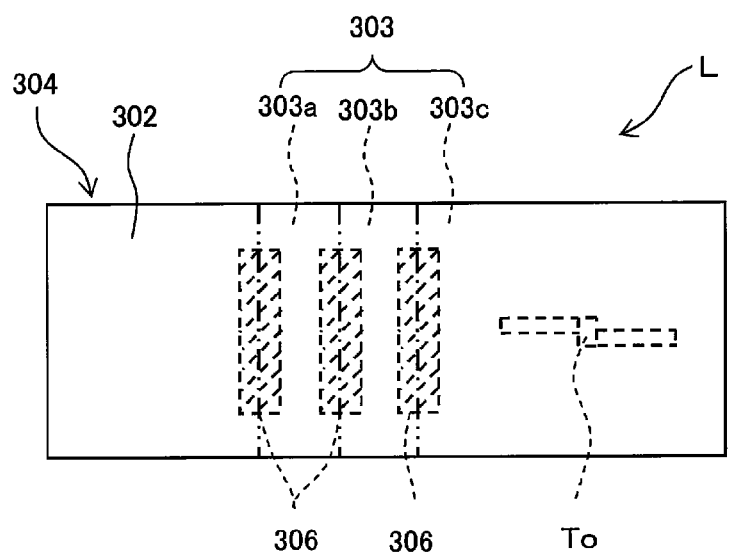
[FIG. 26B]
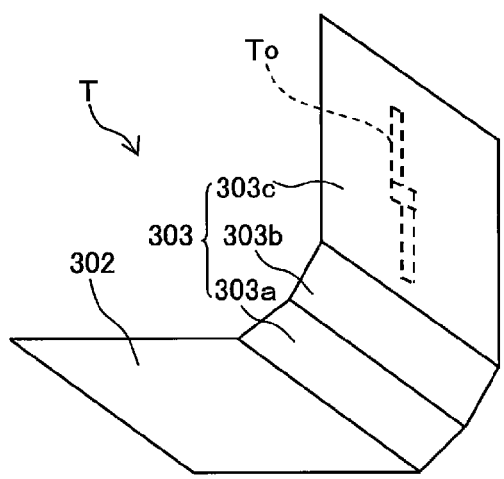

[FIG. 27]
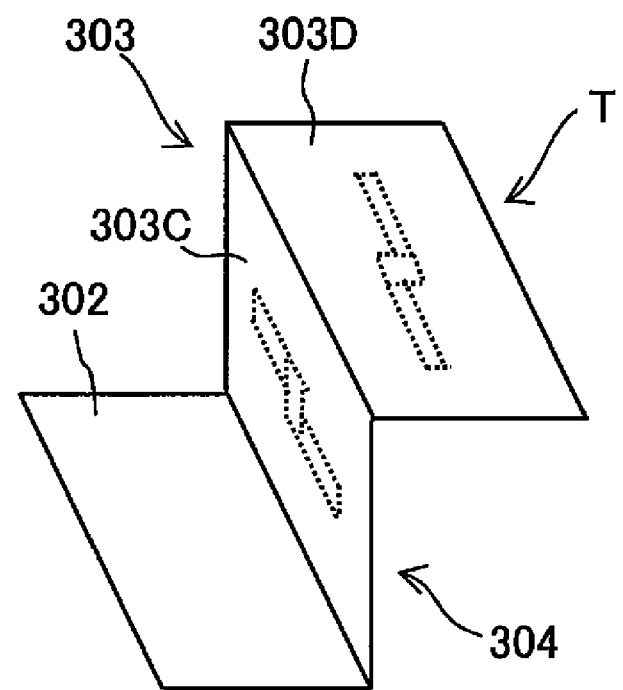

RFID-TAG STRUCTURE BODY, RFID LABEL, AND APPARATUS FOR PRODUCING RFID LABELS

CROSS-REFERENCE TO RELATED APPLICATION

This is a continuation-in-part of International Patent Application No. PCT/JP2007/052316, filed Feb. 9, 2007, which was not published under PCT article 21(2) in English and claims the benefits of Japanese Patent Application Nos. 2006-032675, filed Feb. 9, 2006, and 2006-038915, filed Feb. 16, 2006; the disclosures of which are incorporated herein by reference in their entirety.

BACKGROUND OF THE INVENTION

1. Field of the Invention

The present invention relates to a RFID-tag structure body provided with a RFID circuit element capable of radio communication of information with outside, a RFID label, and an apparatus for producing RFID labels that produces them.

2. Description of the Related Art

A RFID (Radio Frequency Identification) system configured to transmit/receive information contactlessly (electromagnetic coupling method using coil, electromagnetic induction method or electric wave method and the like) with a RFID circuit element storing information is known.

In general, the RFID circuit element is formed as a RFID label on a label-like material, and this RFID label is often affixed onto a target article and the like for classification/organization of various documents/articles, for example. An example of such a RFID label is described in JP, A, 2005-196377, for example.

In the prior art, such configuration is disclosed that a region in a RFID label where the RFID circuit element is not provided is affixed onto an edge portion of a target article to be affixed, while a region where the RFID circuit element is provided is projected outward from the edge portion of the article and a perforation is provided between these two regions so that they can be cut away after affixation.

Recently, applications of the RFID label have become diversified with expansion of its use, and RFID labels in various modes according to the applications are in demand. For example, there emerges a need that a RFID label is to be affixed onto an affixed face made of metal (or affixed face with metal present nearby) such as a spine label of a binder. In such a case, with the above prior art, even if the article is made of metal, the RFID circuit element projects outwardly from the article and is separated from the metal, but since the entire label is simply in a substantially plane shape, the label might be bent by contact, collision or the like and the RFID circuit element having been projected is brought into contact with the metal, which may cause a possible communication failure.

SUMMARY OF THE INVENTION

The present invention has an object to provide a RFID-tag structure body, a RFID label, and an apparatus for producing RFID labels that produces them, which can ensure smoothness/reliability of communication without incurring communication failure even if being affixed onto a metal affixed face (or an affixed face with metal present nearby).

BRIEF DESCRIPTION OF THE DRAWING

FIG. 1 is a perspective view illustrating an entire structure of a RFID tag according to a first embodiment of the present invention in a state affixed onto a metal plate.

FIG. 2 is a top view illustrating an appearance of a RFID label in a state immediately after being produced by an apparatus for producing RFID labels and before being worked and formed.

FIG. 3 is a cross-sectional view by a section in FIG. 2.

FIG. 4 is a functional block diagram illustrating a functional configuration of the RFID tag.

FIG. 5 is a conceptual diagram illustrating a configuration of the apparatus for producing RFID labels.

FIG. 6 is a flowchart illustrating a control procedure executed by a control circuit when the RFID label is to be produced.

FIG. 7 is a graph for illustrating a relation between a separation distance between an affixed face and an antenna and the maximum communication distance of the RFID tag.

FIG. 8 is a perspective view illustrating an entire structure of the RFID tag of a bridge type in a state affixed onto the metal plate.

FIG. 9 is a perspective view illustrating an entire structure of an L-shaped RFID tag in a state affixed onto the metal plate when the antenna is provided across folded self-supporting portions in two sections.

FIG. 10 is a conceptual diagram illustrating a configuration of an apparatus for producing RFID labels according to a variation in which a cut is made in a label body by the apparatus for producing RFID labels.

FIG. 11 is a flowchart illustrating a control procedure executed by the control circuit when the RFID label is to be produced in the variation in which a cut is made in a label body by the apparatus for producing RFID labels.

FIG. 12 is a top view illustrating an appearance of the RFID label in the case of a variation in which a cut is made in a label body by the apparatus for producing RFID labels.

FIG. 13 is a perspective view illustrating an entire structure of the RFID tag in a variation in which a plurality of RFID circuit elements is provided in a single RFID tag.

FIG. 14 is a perspective view illustrating an entire structure of the RFID tag in a variation in which a plurality of RFID circuit elements is provided at a folded self-supporting portion in one section.

FIG. 15 is a perspective view illustrating an entire structure of the RFID tag in a variation in which a grounding member is provided at an affixed portion.

FIG. 16 is a top view illustrating an appearance of the RFID label in the variation in which the grounding member is provided at the affixed portion.

FIG. 17 is a cross-sectional view by a XVII-XVII' section in FIG. 16.

FIG. 18 is a perspective view illustrating an entire structure of the RFID tag according to a second embodiment of the present invention.

FIG. 19 is a plan view illustrating the RFID label for producing the RFID tag in FIG. 18.

FIG. 20 is a longitudinal sectional view by a XX-XX' section in FIG. 19.

FIG. 21 is a longitudinal sectional view illustrating another example of a laminated structure of the label body.

FIG. 22 is a conceptual diagram illustrating a configuration of the apparatus for producing RFID labels.

FIG. 23 is a perspective view illustrating the RFID tag in a variation in which the label body is folded in a different direction.

FIGS. 24A and 24B are a plan view illustrating the RFID label in a variation floated substantially in the U-shape and a perspective view illustrating the RFID tag produced from the RFID label, respectively.

FIGS. 25A and 25B are a plan view illustrating another example of arrangement of a shape-memory element provided in a label body of the RFID label in the variation in FIGS. 24A and 24B.

FIGS. 26A and 26B are a plan view illustrating the RFID label in a variation in a bent and articulated structure and a perspective view illustrating the RFID tag produced from the RFID label, respectively.

FIG. 27 is a perspective view illustrating the RFID tag in a variation in a stepped type.

DETAILED DESCRIPTION OF THE PREFERRED EMBODIMENTS

Embodiments of the present invention will be described below referring to the attached drawings.

A first embodiment of the present invention will be described referring to FIGS. 1 to 17.

FIG. 1 is a perspective view illustrating an entire structure of a RFID tag according to this embodiment in a state affixed onto a metal plate.

In FIG. 1, this RFID tag (RFID-tag structure body) T includes a label body 4 and a RFID circuit element To.

The label body 4 is provided with affixed portions 2a, 2b, and 2c (hereinafter referred to as an affixed portion 2 as appropriate) affixed onto a surface (hereinafter referred to as an affixed face S) of a metal plate M (or may be a face with metal present nearby). The same applies to the following and self-supporting portions (folded self-supporting portions) 3a, 3b, and 3c (hereinafter referred to as folded self-supporting portion 3 as appropriate), which are self-supported with respect to the affixed portion 2 by a folding structure.

The RFID circuit element To has a RFID circuit element To provided with an IC circuit part 150 with a function to store information and a function to reply information by modulating an electric wave received by an antenna (which will be described later) with an information signal and transmitting it and two antennas (tag antennas) 151 connected to the IC circuit part 150 and is provided at the folded self-supporting portion 3 of the label body 4.

The RFID tag T according to the present invention is configured on the premise that it is affixed onto a surface of a metal material (or a surface of an article with metal present nearby), and in a state shown in FIG. 1, the RFID tag T is affixed with the surface of the thin metal plate M as the affixed face S, but not limited to that, it may be affixed onto a surface of metal ingot, for example (the same applies to a second embodiment and variations).

In an example of this embodiment, in a state where the RFID tag T is affixed onto the affixed face S of the metal plate M and the folded self-supporting portion 3 is self-supported as shown in the figure, the two antennas 151 of the RFID circuit element To provided at the folded self-supporting portion 3 has a separation distance with a predetermined length (approximately 3 cm, for example) maintained from the affixed face S of the metal plate M.

The label body 4 is made of a predetermined foldable material and worked and formed into a predetermined structure shown in FIG. 1 by a user, who cuts a predetermined cutting line (cutting line) 5 as a stereo-structure preparation portion in what is produced by an apparatus for producing RFID labels as a substantially tape-shaped RFID label L (See FIG. 2, which will be described later) and folds predetermined folding lines (lines for folding) 6, 7 as the stereo-structure preparation portion as will be described.

FIG. 2 is a top view illustrating an appearance of the RFID label L in a state immediately after being produced by the apparatus for producing RFID labels and before being worked and formed, and FIG. 3 is a cross-sectional view by a III-III' section in FIG. 2.

In FIG. 2, an self-support folding line 6, which is one of valley folding lines is printed in a predetermined mode (one-dot chain line in this example) at the center in the width direction (upper and lower direction in the figure) of the label body 4 in the RFID label L formed in the tape shape, a lower portion in the figure from the self-support folding line 6 being the affixed portion 2 and an upper portion in the figure from the self-support folding line 6 being a folded self-supporting portion 3. In this example, the folded self-supporting portion 3 is divided into three regions of 3a, 3b, and 3c in the tape longitudinal direction (right and left direction in the figure), and a stable folding line 7, which is mountain folding and one of the folding lines, is printed at the boundary among the sections 3a, 3b, and 3c in a predetermined mode (a dot line or a broken line in this example) in the tape width direction (upper and lower direction in the figure). In the affixed portion 2 on the lower side in the figure from the self-support folding line 6, a cutting line 5 is printed in a predetermined mode (a solid line in this example) on an extension of each stable folding line 7. In the section 3a of the folded self-supporting portion 3, print information ("Article 1" in this example) R corresponding to a target (a metal plate M in this example) to be affixed is printed.

The section 3b located at the center of the folded self-supporting portion 3 in this example is formed with a dimension longer in the tape longitudinal direction (right and left direction in the figure) than the other sections, and a RFID circuit element To is provided in this center section. Two antennas 151, 151 of the RFID circuit element To are substantially linear dipole antennas in this example and connected to be in parallel arrangement with the tape longitudinal direction (right and left direction in the figure). Each antenna 151 is arranged not to be overlapped with any of the cutting line 4, self-support folding line 6 and the stable folding line 7. The two antennas 151, 151 are separated from the self-support folding line 6 in the arrangement with a distance of approximately 3 cm.

As shown in FIG. 3, the label body 4 of the RFID label L is in a multi-layer laminated structure (three-layer structure in this example), in which a base film layer (base layer) 4a made of PET (polyethylene terephthalate) or the like, an adhesive layer 4b made of an appropriate adhesive, and a separation sheet layer 4c are laminated in this order from the front side (upper side in FIG. 3) to the opposite side (lower side in FIG. 3) to constitute the three layers. The RFID circuit element To in this example is provided in the adhesive layer 4b on the back side of the base film layer 4a, and the cutting line 5, self-support folding line 6, and stable folding line 7 (only the self-support folding line 6 is shown in FIG. 3) are printed on the front side of the base film layer 4a. In this example, only the separation sheet layer 4c is cut (half-cut) on the self-support folding line 6 so that adhesion can be made by the adhesive layer 4b on an affixed face S such as the metal plate M or the like by easily peeling off only the separation sheet layer 4c in the affixed portion 2.

In this example, a user can form the RFID tag T in the structure as shown in FIG. 1 by cutting the label body 4 of the RFID label L shown in FIG. 2 along the cutting line 5 printed by a solid line with scissors or the like, valley-folding the self-support folding line 6 and mountain-folding each of all the stable folding lines 7 and affix it on the affixed face S of the metal plate M further by peeling off only the separation sheet layer 4c in the affixed portion 2.

As a result, in the RFID tag T, the affixed portions 2a, 2b, and 2c divided into three parts as shown in FIG. 1 are surely affixed onto the affixed face S, respectively, and the folded self-supporting portions 3a, 3b, and 3c divided into three sections are made in a substantially rectangular shape, respectively, and stably self-supported in a direction substantially perpendicular to the affixed face S (affixed portion 2). With the arrangement, the RFID circuit element To provided at the folded self-supporting portion 3b is surely kept in a state separated from the affixed face S on the surface of the metal plate M.

FIG. 4 is a functional block diagram illustrating a functional configuration of the RFID tag T.

In FIG. 4, the RFID circuit element To has the antenna 151 configured to transmit/receive a signal contactlessly using a radio frequency in an UHF band (915 MHz in this example) with an antenna on an apparatus for communicating with a RFID label, not shown, and the IC circuit part 150 connected to the antenna 151 and provided with a function to store information.

The IC circuit part 150 is provided with a rectification part 152 configured to rectify a carrier wave received by the antenna 151, a power source part 153 configured to accumulate energy of the carrier wave rectified by the rectification part 152 and to make it a driving power source, a clock extraction part 154 configured to extract a clock signal from the carrier wave received by the antenna 151 and to supply it to a control part 157, a memory part 155 that stores a predetermined information signal, a modem part 156 connected to the antenna 151, and the control part 157 configured to control operation of the entire RFID circuit element To through the rectification part 152, the clock extraction part 154, the modem part 156 and the like.

The modem part 156 demodulates a communication signal received by the antenna 151 and modulates and reflects a carrier wave received by the antenna 151 based on a reply signal from the control part 157. The control part 157 executes basic control such as interpretation of a received signal demodulated by the modem part 156, generation of a reply signal based on the information signal stored in the memory part 155, and reply by the modem part 156.

The RFID tag T configured and used as above is produced by an apparatus for producing RFID labels as a RFID label L before being worked into the RFID tag T. FIG. 5 is a conceptual explanatory diagram illustrating an example of the configuration. In FIG. 5, the label body 4 is shown in a single layer structure omitting the base film layer 4a and the separation sheet layer 4c in order to avoid complexity in the figure.

In FIG. 5, the apparatus 100 for producing RFID labels is provided with a tag tape roll holder portion 110 capable of detachable attachment of a roll of tape with RFID tag 104 around which a tag tape (label medium) 103 having the RFID circuit elements To with a predetermined interval is wound (or capable of detachable attachment of a cartridge provided with the roll of tape with RFID tag 104), a print head 105 (line printing device, stereo-structure processing device; character/image printing device) as a printing device configured to print predetermined lines (solid line, one-dot chain line, dot line, broken line or the like) corresponding to the self-support folding line 6, stable folding line 7, and cutting line 5 on the outer surface of the base film layer 4a (See FIG. 3) in the tag tape 103 fed out of the roll of tape with RFID tag 104 and print information R, an apparatus antenna (transmitting/receiving device) 106 configured to transmit/receive information by radio communication with the RFID circuit element To, a radio frequency circuit (transmitting/receiving device) 101 configured to access (read out or write in) the RFID circuit element To through the apparatus antenna 106, a cutting cutter 107 configured to cut the tag tape 103 having finished with print on the tag tape 103 and the information writing on the RFID circuit element To into a predetermined length to make it the RFID label L, a solenoid 108 configured to perform a cutting operation by driving the cutting cutter 107, a solenoid driving circuit 109 for cutoff configured to control the solenoid 108 based on a control signal from a control circuit 102, a half cutter 111 for half-cut only of the separation sheet layer 4c, a solenoid 112 configured to perform a half-cut operation by driving the half cutter 111, a solenoid driving circuit 113 for half-cut configured to control the solenoid 112, an operation portion (selecting device) 114 configured to select and input the contents of the print information R, a print region on which the print information R is printed, and writing information onto the RFID circuit element To, a feeding roller (feeding device) 115 provided opposite the print head 105 and controlled by the control circuit 102 so as to feed the roll of tape with RFID tag 104, a motor 116 configured to drive the feeding roller 115, a motor driving circuit 117 configured to control the motor 116 based on a control signal from the control circuit 102, and the control circuit 102 configured to control the entire operation of the apparatus 100 for producing RFID labels through the radio frequency circuit 101, the solenoid driving circuit 109 for cutoff, the solenoid driving circuit 113 for half-cut, the motor driving circuit 117 and the like.

The radio frequency circuit 101 and the control circuit 102 are in known configuration and the detailed description will be omitted, but they generate access information for the IC circuit part 150 of the RFID circuit element To, transmit it to the RFID circuit element To through the apparatus antenna 106, and perform information writing in the memory part 155 in the IC circuit part 150 of the RFID circuit element To (or read out information from the IC circuit part 150). The control circuit 102 is connected to other computers, servers, terminals and the like through a wired or radio communication line (network) and capable of information transmission/reception with them.

FIG. 6 is a flowchart illustrating a control procedure executed by the control circuit 102 of the apparatus 100 for producing RFID labels when the RFID label L is to be produced.

In FIG. 6, first, at Step S110, a print region is selected through the operation portion 114, the print information R to be printed in the selected print region of the RFID label L and the writing information to the RFID circuit element To are operated and input, and a corresponding selection signal/operation signal is input. With regard to the selection of the print region, any of the folded self-supporting portions 3a, 3b, and 3c divided by the stable folding line 7 and the affixed portions 2a, 2b, and 2c divided by the cutting line 5 may be selected individually or the entire folded self-supporting portion 3 may be selected.

After that, the routine goes to Step S120, where a control signal is output to the motor driving circuit 117 so as to drive the feeding roller 115 through the motor 116 and feed the tag tape 103, while a control signal is output to the print head 105 so that the print information R input at Step S110 and the cutting line 5 and folding lines 6, 7 are printed. A control signal is also output to the radio frequency circuit 101 and the information input at Step S130 is written in the RFID circuit element To through the antenna 106 (writing of a tag ID, which is identification information, article information to be stored, the set values and the like).

After that, at Step S130, a control signal is output to the solenoid driving circuit 109 for cutoff so as to drive the cutting cutter 107 through the solenoid 108 and to cut the tag tape 103, while a control signal is output to the solenoid driving circuit 113 for half-cut so as to drive the half cutter 111 through the solenoid 112 and to carry out the half-cut, by which the RFID label L provided with a single RFID circuit element To is produced, and this flow is finished.

As mentioned above, in the RFID tag T of this embodiment, the folded self-supporting portion 3 is self-supported with respect to the affixed face S by its three-dimensional structure realized by folding, and the RFID circuit element To is provided at this folded self-supporting portion 3 which is self-supported. In more detail, the affixed portion 2 and the folded self-supporting portion 3 can be formed easily and surely by folding along the self-support folding line 6, and the folded self-supporting portion 3 is divided into a plurality of parts by folding along the stable folding line 7, each of which supports each other with an angle so as to form a three-dimensional structure.

As a result, when the entire structure is affixed onto the affixed face S, a state where the RFID circuit element To and particularly the antenna 151 thereof is separated from the affixed face S can be maintained surely. Therefore, even if it is affixed onto the metal affixed face S through the affixed portion 2 (or also when it is affixed onto the affixed face with metal present near by), communication failure does not occur but smoothness and reliability of communication can be ensured.

Particularly in this embodiment, in the RFID label L produced as a member before the RFID tag T is worked, since the lines for folding (self-support folding line 6, stable folding line 7) and the cutting line 5 for realizing the three-dimensional structure when being affixed onto the affixed face S are printed on the label body 4, when a user cuts the label body 4 along the cutting line 5 and folds it along the lines for folding 6, 7, the three-dimensional structure having the affixed portion 2 to be affixed onto the affixed face S and the folded self-supporting portion 3 which is self-supported with respect to the affixed face S by the folding structure through the lines for folding 6, 7 can be formed.

Particularly in the RFID label L in this embodiment, the self-support folding line 6 as the folding line is printed in a one-dot chain line, the stable folding line 7 in a broken line or dot line, and the cutting line 5 in a solid line, that is, each of the lines 5, 6, and 7 is printed on the label body 4 in different modes. With the arrangement, the lines for folding 6, 7 can be clearly distinguished from the cutting line 5, and a possibility of wrong folding or wrong cutting into the lines for folding 6, 7, which would result in damage on the RFID label L can be restricted, and assuredness to form a desired three-dimensional structure can be improved. Other than the line style as above, the print mode may be made different by a difference in color of the lines, for example.

Particularly in the RFID label L in this embodiment, the self-support folding line 6 is arranged in parallel with the tape longitudinal direction of the label body 4, and the stable folding line 7 and the cutting line 5 are arranged in parallel with the tape width direction of the label body 4. Thus, the affixed portion 2 and the folded self-supporting portion 3 can be formed in an organized substantial rectangle, respectively, which can give a sense of stability to a user in a state where the entire structure is affixed onto the affixed face S. Since the self-supporting folding line 6 is arranged substantially in parallel with the longitudinal direction of the label body 4, the height of the folded self-supporting portion 3 itself is kept small to lower the center of gravity, and the width can be taken larger with the affixed portion 2. Thus, both affixation and self-support can be stabilized. Moreover, by arranging the stable folding line 7 substantially in parallel with the width direction of the label body 4, that is, by arranging the stable folding line 7 substantially perpendicular to the self-support folding line 6, each of the divided folded self-supporting portion 3 can be made to stand upright with respect to the affixed face S while folding the stable folding line 7.

Particularly in the RFID label L in this embodiment, since the RFID circuit element To is arranged so as not to overlap the self-support folding line 6, even if the label body 4 is folded along the self-support folding line 6 so as to form the three-dimensional structure, the entire RFID circuit element To is contained within the folded self-supporting portion 3, and the state where the antenna 151 and the like are separated from the affixed face S can be surely maintained. Also, since the RFID circuit element To is arranged so as not to overlap the cutting line 5, damage by wrong folding and cutting into the antenna 151 of the RFID circuit element To can be prevented, and normal functions can be ensured.

Particularly in the RFID label L in this embodiment, since the separation material layer 4c is half-cut on the self-support folding line 6 to be a boundary between the folded self-supporting portion 3 and the affixed portion 2, the separation material layer 4c can be peeled off easily only at the affixed portion 2 where the adhesive layer 4b needs to be exposed.

Particularly in the RFID label L in this embodiment, a separation distance between the affixed face S and the tag antenna 151 when being affixed onto the affixed face S is set at 3 cm as mentioned above, but this is set based on a communication frequency of the RFID circuit element To according to a communication characteristic of the RFID tag T newly found by the inventors of the present application and the like. This will be described below in more detail.

FIG. 7 is a graph for illustrating an influence of a separation distance between the affixed face and the antenna on the maximum communication distance of the RFID tag. The characteristics shown in this graph are for a case where the RFID label is arranged apart from the metal and the antenna of a communication counterpart equipment (hereinafter referred to as equipment antenna) is further arranged on an extension of the separation distance (not particularly shown) and illustrating a state of change of the maximum distance (communication distance) over which the RFID tag T and the communication counterpart equipment can communicate with each other when the separation distance is changed. For a communication frequency of the radio communication, an example using 915 MHz used for the RFID tag is shown.

As shown in FIG. 7, with the communication frequency at 915 MHz, when the tag antenna and the affixed face of the metal plate are proximate as close as contact, that is, the separation distance≈0 the function of the tag antenna can not be obtained and the maximum communication distance becomes substantially 0 mm. As the separation distance is increased from that contact state, the maximum communication distance is also increased, and when the separation distance is increased to substantially 25 mm ($1/12$ to the wavelength of $\lambda=300$ mm) or more, the maximum communication distance becomes 720 mm or more (80% distance to 900 mm, which will be described later), which shows a characteristic that the maximum communication distance is asymptotically increased after that as the separation distance is increased, and when the separation distance reaches substantially 45 mm or more ($3/20$ to the wavelength of $\lambda=300$ mm), the maximum communication distance becomes 900 mm (100% distance). Therefore, it is known that, by ensuring the separation distance of at least $1/12$ or more of wavelength $\lambda$, communication performance of 80% distance or more can be ensured, and the communication performance of the 100% distance is ensured at least up to the separation distance of 90 mm (3/10 to the wavelength of λ=300 mm) even in the illustrated range.

In this embodiment, the separation distance between the affixed face S and the tag antenna 151 is set using the communication characteristics of the RFID tag, and by setting the separation distance at 3 cm between 1/12(=λ/12≈25 mm) and 1/10(=3λ/10≈90 mm) of the wavelength λ (≈30 cm) corresponding to the case of the separation distance at the communication frequency (=915 MHz), the maximum communication distance approximately 80% distance or more (approximately 800 mm in this example) can be obtained. Within this range, when the communication frequency is set at least at 915 MHz, a sufficient communication distance can be obtained.

That is, by appropriately setting the separation distance between the affixed face S of the metal and the tag antenna 151 according to the wavelength corresponding to the communication frequency of the radio-communication as above, reflection generated between the metal affixed face S and the tag antenna 151 can be effectively used, by which the communication distance can be increased.

Particularly in the apparatus 100 for producing RFID labels of this embodiment, by printing characters and figures on the label body 4 by the print head 105, information stored in the RFID circuit element To, for example, can be visually clarified by the characters and figures associated with the information.

Particularly in the apparatus 100 for producing RFID labels of this embodiment, since the apparatus 100 for producing RFID labels has the operation portion 114 and an operator can select and input by the operation portion 114 on which of the affixed portion 2 and the folded self-supporting portion 3 in the label body 4, the print of characters or figures is to be applied by the print head 105. With the arrangement, on which of the surface of the affixed face S (surface of the affixed portion 2) and a face self-supported from the affixed face S (surface of the folded self-supporting portion 3) the characters and the figures are to be printed can be arbitrarily selected based on comparison of ease to recognize or the like.

The cut formed in the label body 4 in the RFID tag T is not indispensable but the RFID circuit element To may be configured to be provided at the folded self-supporting portion 3 in a bridge-like shape as shown in FIG. 8, for example.

Though the two stable folding lines 7 (and cutting lines 5) are provided in the RFID tag T so as to divide the folded self-supporting portion 3 into three parts, the present invention is not limited to that, but as shown in FIG. 9, for example, only one stable folding line 7 may be provided so as to divide the folded self-supporting portion 3 into two parts so that the RFID tag T in the affixed state is formed in the L shape when seen from the plane. Though not particularly shown, three or more stable folding lines 7 may be provided so that the RFID tag T is formed in a polygonal shape when seen from the plane. In this case, the more the stable folding lines 7 are provided, the more stable the three-dimensional structure of the RFID tag T becomes, and self-support of the folded self-supporting portion 3 is further ensured. Alternatively, as long as the stable folding line 7 is arranged extending from the vicinity of one end of the cutting line 5, it does not necessarily have to be perpendicular to the self-support folding line 6, and even if not being perpendicular, the folded self-supporting portion 3 can be inclined to be self-supported.

In the above RFID tag T, the RFID circuit element To is provided with the dipole antenna for electric-wave communication, but the present invention is not limited to that but a loop antenna (not particularly shown) may be provided for communication by electromagnetic induction. In either case of the antennas, it is only necessary to maintain a state where the antenna is separated from the affixed face S, and it is possible to provide an antenna 151A with appropriate shape and length in arrangement overlapping the stable folding line 7 as shown in the above-mentioned FIG. 9 and to fold the antenna 151A along the stable folding line 7 for use when the RFID tag T is formed.

The above first embodiment is not limited to the above mode but is capable of various variations in a range without departing from its technical idea and gist. The variations will be described below.

(1-1) When a Cut is Made in the Label Body by the Apparatus for Producing RFID Labels:

In the above embodiment, the apparatus 100 for producing RFID labels prints the cutting line 5 together with the folding lines on the tag tape (label body 4) and produces the RFID label L so that a user makes cutting along the cutting line 5 after that, but the present invention is not limited to that, but a cutter for cutting may be provided at the apparatus for producing RFID labels, for example, so that a cut may be made when the RFID label L is produced.

FIG. 10 is a conceptual diagram illustrating a configuration of an apparatus 200 for producing RFID labels according to this variation and corresponds to FIG. 5. In FIG. 10, a difference from the configuration of the apparatus 100 in the above embodiment shown in FIG. 5 is that the apparatus 200 is provided with a cutting-in cutter (cut forming device, stereostructure processing device) 121 configured to cut into a predetermined position in the label body 4, a solenoid 122 configured to drive the cutting-in cutter 121 to cause it to perform a cutting-in operation, and a solenoid driving circuit 123 for cutting-in configured to control the solenoid 122. This cutting-in cutter 121 is, unlike the cutting cutter 107 for fully cutting off (separating) the tag tape 103, can make a cut with an arbitrary length in the tape width direction of the tag tape 103. Since the other configuration is the same as that of the above embodiment, the description will be omitted. In FIG. 10, illustration of the half-cutter and a driving portion related to that is omitted in order to avoid complexity.

FIG. 11 is a flowchart illustrating a control procedure executed by the control circuit 102 when the RFID label L is to be produced in this variation and corresponds to FIG. 6.

In FIG. 11, a difference from the flowchart shown in FIG. 6 is that a step S120A is provided instead of Step S120. That is, a control signal is output to the motor driving circuit 117 and the feeding roller 115 is driven through the motor 116 so as to feed the tag tape 103, while a control signal is output to the print head 105 so that the print of the print information R and the folding lines 6, 7 input at Step S110 are applied, and a control signal is output to the radio frequency circuit 101 and the information input at Step S110 is written in the RFID circuit element To through the antenna 106, and moreover, when the tag tape 103 reaches a predetermined feeding position, a control signal is output to the solenoid driving circuit 123 for cutting-in and control is executed so that the cutter 121 for cutting-in is driven through the solenoid 122 so as to make a cut with a predetermined length in the tag tape 103. Since the other procedures are the same as those of the first embodiment, the description will be omitted.

FIG. 12 is a top view illustrating an appearance of the RFID label L immediately after being produced by the apparatus 200 for producing RFID labels in this variation and before working and formation and corresponds to FIG. 2. In FIG. 2, a cut 8 is made in the label body 4 instead of printing the cutting line, and a user can form the RFID tag T only by folding the lines for folding 6, 7 without cutting-in with scissors and the like.

As mentioned above, in the RFID label L in this variation, the cut 8 for realizing the three-dimensional structure when being affixed onto the affixed face S is formed in advance, and by expanding the cut 8 and affixing the affixed portions 2a, 2b, and 2c in its vicinity onto the affixed face S, the three-dimensional structure that can surely maintain the state where the RFID circuit element To is separated from the affixed face S can be formed. As a result, the same effect as that of the above embodiment can be obtained.

Particularly in the apparatus 200 for producing RFID labels of this variation, since the cutting-in cutter 121 is provided for forming the cut 8 for realizing the three-dimensional structure when the RFID tag T is affixed onto the affixed face S on the label body 4, the RFID label L with the cut 8 formed at an appropriate position in advance can be formed, and the three-dimensional structure of the RFID tag T can be formed easily.

In the apparatus 200 for producing RFID labels in FIG. 10, the solenoid driving circuit for cutoff may be replaced by use of the solenoid driving circuit for cutting-in that can specify the cut length. In this case, the cut length is specified shorter than the tape width at the cutting-in, while the cut length is set the same as or slightly longer than the tape width at the cutting. As a result, the number of parts can be reduced, and reduction in size and cost of the apparatus can be realized.

(1-2) When a Plurality of RFID Circuit Elements To is Provided at a Single RFID Tag T:

In the above first embodiment, a single RFID circuit element To is provided at a single RFID tag T, but the present invention is not limited to that, a plurality of RFID circuit elements To may be provided.

FIG. 13 is a perspective view illustrating the entire structure of the RFID tag T according to this variation in a state affixed onto the metal plate M. In FIG. 13, the folded self-supporting portion 3 of the RFID tag T is divided by a single stable folding line 7 into two parts, the two parts are affixed in arrangement substantially perpendicular to each other, and the RFID circuit elements To are provided in each of them. The two RFID circuit elements To are arranged so that the antenna 151 is in substantially parallel with the self-support folding line 6 (substantially in parallel with the affixed face S) in each of them.

With the arrangement, the antennas 151 provided in each of the two RFID circuit elements To are in an arrangement relation substantially perpendicular to each other, which enable diversified variations in directivity direction and polarization phase direction of a communication wave, and reliability of communication can be further ensured.

A plurality of RFID circuit elements To may be provided at one of the sections in the folded self-supporting portion 3, and in this case, as shown in FIG. 14, by making the arrangement directions of the antennas 151 of the RFID circuit elements To different from each other, the variation in the polarization phase direction of the communication wave can be coped with.

(1-3) When a Grounding Member is Provided at the Affixed Portion:

In this variation, a grounding member is provided at the affixed portion 2 of the RFID tag T, and the grounding member is connected to the RFID circuit element To of the folded self-supporting portion 3 to be grounded.

FIG. 15 is a perspective view illustrating the entire structure of the RFID tag T according to this variation in a state being affixed onto the metal plate M. In FIG. 15, the folded self-supporting portion 3 of the RFID tag T is divided into two parts by the single stable folding line 7, and the RFID circuit element Tos is provided at one of the parts. This RFID circuit element Tos has the IC circuit part 150 located at a lower part, and only one antenna 151 constituted by a dipole antenna is directed upward and connected to the upper part of the IC circuit part 150. At the two affixed portions 2a, 2b, grounding members 9a, 9b, which will be described later, are provided, respectively.

FIG. 16 is a top view illustrating an appearance of the RFID label L in a state before working and formation of the RFID tag T of this variation, and FIG. 17 is a cross-sectional view by a XVII-XVII' section in FIG. 16.

In FIGS. 16 and 17, the grounding members 9a, 9b provided at each of the divided affixed portions 2a, 2b are thin plates made of a conductive material and provided within the adhesive layer 4b on the back side of the base film layer 4a in each of the affixed portions 2a, 2b. The grounding members 9a, 9b are connected to each other through a connecting member 10, and one grounding member 9b is connected to the IC circuit part 150 across the self-support folding line 6 through the connecting member 11.

When the RFID tag T in the above configuration is affixed onto the affixed face S of the metal plate M, the grounding members 9a, 9b are not brought into direct contact, since the thin adhesive layer 4b is interposed between the members and the affixed face S, but the grounding members 9a, 9b and the affixed face S constitute a capacitor in cooperation so that an electric current sufficient for grounding flows to the grounding members 9a, 9b. By grounding the metal affixed face S through the grounding members 9a, 9b as above, a receiving sensitivity of the RFID circuit element To can be improved. Other than the grounding through the above capacitor coupling, by forming the grounding members 9a, 9b so as to partially penetrate the adhesive layer 4b, the grounding members 9a, 9b can be brought into direct contact with the affixed face S for complete grounding when the affixed portions 2a, 2b are affixed.

A second embodiment of the present invention will be described referring to FIGS. 18 to 27. This embodiment embodies the three-dimensional structure using a shape-memory element. The same reference numerals are given to the portions equivalent to those in the first embodiment, and the description will be omitted or simplified as appropriate.

FIG. 18 is a perspective view illustrating the entire structure of the RFID tag according to this embodiment in a state affixed onto a metal plate.

In FIG. 18, the RFID tag (RFID-tag structure body) T has an affixed portion (first affixed portion) 302 to be affixed onto the surface of the metal plate M (affixed face S), an self-supporting portion (first self-supporting portion) 303 folded at a right angle and self-supported with respect to the affixed portion 302, and the RFID circuit element To provided at this self-supporting portion 303, and at least at one of the affixed portion 302 and the self-supporting portion 303, a shape-memory element 306 (See FIG. 19, which will be described later) as a stereo-structure preparation portion to make the self-supporting portion 303 self-supported is provided.

The self-supporting portion 303 is consecutively provided in the tag label longitudinal direction of the affixed portion 302 at a stage of the tag label, and in a state where the RFID tag T is affixed onto the affixed face S of the metal plate M and the self-supporting portion 303 is self-supported as shown in the figure, the two antennas 151 of the RFID circuit elements To provided at the self-supporting portion 303 are separated from each other in the lateral direction and extended. The antenna 151 of the RFID circuit element To is configured so that a separation distance of approximately 3 cm is maintained from the affixed face S of the metal plate M below at the center position.

FIG. 19 is a plan view illustrating the RFID label L for producing the RFID tag T in FIG. 18.

As shown in FIG. 19, the RFID label L is provided with a substantially tape-shaped label body 304 and the RFID circuit element To provided at the label body 304 and is further provided with a shape-memory element 306 at the label body 304.

The shape-memory element 306 is provided at a center position in the longitudinal direction in the label body 304 with a limited width in a width direction perpendicular to it and is shape-memory applied in advance so that the label body 304 is valley-folded at a portion shown by a virtual line 305 by shape change to the original shape by heating.

In the label body 304, the affixed portion 302 is partitioned by the shape-memory element 306 on the left side in the figure from the virtual line 305, while the self-supporting portion 303 is partitioned on the right side in the figure, and the RFID circuit element To is provided in the self-supporting portion 303.

The shape-memory element 306 has a nature that a shape is given by pressurization in a predetermined heat treatment, the original shape given by heating the element in a plane shape at a room temperature is recovered, and the original shape is maintained at the room temperature. As such shape-memory element 306, shape-memory alloys including titanium-nickel alloy, copper-zinc-aluminum alloy, and the like and shape-memory resins including polyurethane can be used. The shape-memory element 306 may be provided over substantially the entire label body 304 (See FIGS. 25A, 25B and the like, which will be described later), but by locally providing at a portion to be folded at use of the label, including a connection portion between the affixed portion 302 and the self-supporting portion 303 as in the second embodiment, an occupied space in the label body 304 can be kept as little as possible and the shape-memory function can be exerted.

As shown in FIG. 19, instead of valley-folding on the virtual line 305 along the width direction of the label body 304 (vertical direction in FIG. 19), the valley-folding is applied on the diagonal virtual line 305 with a predetermined angle θ with respect to the width direction (vertical direction in FIG. 19) of the label body 304, and the shape-memory element 306 may be arranged in accordance with that.

FIG. 20 is a longitudinal sectional view by a XX-XX' section in FIG. 19, illustrating an example of a laminated structure of the label body 304. In FIG. 20, in this example, the label body 304 of the RFID label L is basically in a five-layer structure excluding the RFID circuit element To and its vicinity, in which a cover film (print-receiving tape layer) 130, an adhesive layer (bonding adhesive layer) 101a made of an appropriate adhesive, a colored base film (tape base layer) 101b made of PET (polyethylene terephthalate) or the like, and an adhesive layer (mounting adhesive layer) 101c made of an appropriate adhesive are provided in order from the front side (upper side in FIG. 20) to the opposite side (lower side in FIG. 20), and then, with a protective film 160 covering the IC circuit part 150 sandwiched and below that, an antenna pattern sheet 161 (antenna base) having two antennas 151A, 151B for information transmission/reception arranged in advance on the surface side and an adhesive layer (affixing adhesive layer) 101d made of an appropriate adhesive are provided in this order. The cover film 130 is affixed to the upper adhesive layer 101a, while the separation sheet (separation material layer) 101e is affixed to the lower adhesive layer 101d.

The protective film 160 is constructed by a resin, for example, and the IC circuit part 150 is located on the back side of the protective film 160 and connected to the antennas 151, 151 of the antenna pattern sheet 161 through two connection terminals 159, 159, respectively. The RFID circuit element To is constituted by the IC circuit part 150 and the antennas 151A, 151B, and a structure in which the RFID circuit element To and the protective film 160 are arranged on the antenna pattern sheet 161 constitutes a RFID tag IC circuit holding body H.

On the lower face side of the adhesive layer 101a on the side of the cover film 130 in the label body 304, the shape-memory element 306 is provided in the label width direction (front and rear direction toward the paper face) in a region over the front and rear of the virtual line 305 in the label longitudinal direction (right and left direction in the figure). As mentioned above, the region on the left side in the figure of the label body 304 from the virtual line 305 is the affixed portion 302, while the region on the right side in the figure is the self-supporting portion 303.

FIG. 21 is a longitudinal sectional view illustrating another example of the laminated structure of the label body 304 and corresponds to FIG. 20. The same reference numerals are given to the portions equivalent to those in FIG. 20.

In FIG. 21, in this example, the label body 304 of the RFID label L is constructed by a thermal tape. The label body 304 is basically in a four-layer structure excluding the RFID circuit element To and its vicinity, in which a colored base film (tape base layer) 101'b made of PET (polyethylene terephthalate) or the like and an adhesive layer (mounting adhesive layer) 101'c made of an appropriate adhesive are provided in order from the front side (upper side in FIG. 21) to the opposite side (lower side in FIG. 21), and then, with the protective film 160 covering the IC circuit part 150 sandwiched and below that, the antenna pattern sheet 161 (antenna base) having two antennas 151A, 151B for information transmission/reception arranged in advance on the surface side, an adhesive layer (affixing adhesive layer) 101'd made of an appropriate adhesive and a separation sheet (separation material) 101'e are laminated in this order.

On the lower face side of the adhesive layer 101'c of the label body 304, similarly to FIG. 20, the shape-memory element 306 is provided in the width direction (front and rear direction toward the paper face) in a region over front and rear of the virtual line 305 in the label longitudinal direction (right and left direction in the figure), and a region on the left side in the figure of the label body 304 from the position of the virtual line 305 is the affixed portion 302, while the region on the right side in the figure is the self-supporting portion 303.

When a user heats the label body 304 in the RFID label L shown in FIG. 19 or 21, the label body 304 is valley-folded at a portion of the virtual line 305 by deformation of the shape-memory element 306, and the RFID tag T in the structure as shown in FIG. 18 can be formed. Moreover, it can be affixed onto the affixed face S of the metal plate M by peeling off only the separation sheet 101e in the affixed portion 302. As a result, the RFID circuit element To provided at the self-supporting portion 303 in the label body 304 (at least the two antennas 151 in them) is surely maintained in a state separated from the affixed face S on the surface of the metal plate M by approximately 3.0 cm.

The shape-memory element 306 is provided in the adhesive layers 101a, 101'c in the above example, but not limited to that. If the shape-memory element 306 is a shape-memory alloy, for example, it can be provided at the antenna 151 of the RFID circuit element To (or the antenna 151 itself can be constructed by the shape-memory alloy). If the shape-memory element 306 is a shape-memory resin, it can be provided at the cover film 130, the antenna pattern sheet 161 or the base films 101*b*, 101'*b* (or they can be constructed by the shape-memory resin).

FIG. 22 is a diagram illustrating an example of an apparatus for producing RFID labels for producing the RFID label L shown in FIG. 21 and corresponds to FIG. 5 in the above first embodiment. In this example, the example of the RFID label L in the laminated structure shown in FIG. 21 is illustrated. In FIG. 22, only the RFID circuit element To (IC circuit part 150 and the two antennas 151) are shown in the tag tape 103 on which the label body 304 is provided continuously, and the shape-memory element 306 is not shown in order to avoid complexity. The same reference numerals are given to the portions equivalent to those in FIG. 5 and the description will be omitted or simplified as appropriate.

In FIG. 22, in this apparatus 400 for producing RFID labels, the half cutter 111, the solenoid 112, and the solenoid driving circuit 113 for half cutter provided in the first embodiment are omitted. Instead, a pair of feeding rollers 418 driven by a feeding motor (driven and controlled by the control circuit 102) provided on the downstream side of the apparatus antenna 106 but not shown are provided. The control circuit 102 controls an operation of the entire apparatus 400 for producing RFID labels through the radio frequency circuit 101, the solenoid driving circuit 109 for cutoff, the motor driving circuit 117 and the like.

The apparatus 400 is provided with a deformation working portion 420 partitioned from the other portion through a wall 419 on the downstream side in the feeding direction of the feeding roller 418. In the deformation working portion 420, a drier 421 (heater, heating device) as the stereo-structure processing device is made to generate heat by supplying electric current from a heating power source 122, the RFID label L obtained by cutting by the cutter 107 is heated, and the shape-memory element 306 of the label body 304 is heated and deformed so that the RFID tag T having the label body 304 worked into a structure with the L-shaped section shown in FIG. 18 can be obtained.

As mentioned above, in the RFID label L in this second embodiment, the shape-memory element 306 is provided in the label body 304. The label is affixed onto the affixed face S of the metal plate M to be affixed through the affixed portion 302 of the label body 304, while by heating the label body 304, the self-supporting portion 303 is self-supported with respect to the affixed face S by the shape-memory function of the shape-memory element 306, and the RFID circuit element To is provided at the self-supporting portion 303. With the arrangement, after the entire RFID tag T is affixed onto the affixed face, the state where the RFID circuit element To is separated from the affixed face S can be surely maintained, and even if affixation is made on the affixed face S, which is metal (or metal is present nearby), communication failure does not occur but smoothness and reliability of the communication can be ensured.

Particularly in the RFID label L of this second embodiment, the separation distance between the affixed face S and the tag antenna 151 is set at 3 cm as mentioned above when being affixed onto the affixed face S. This enables a sufficient communication distance similarly to the description in the first embodiment using FIG. 7 at least when the communication frequency is set at 915 MHz. By appropriately setting the separation distance between the metal affixed face S and the tag antenna 151 according to the wavelength corresponding to the communication frequency of the radio communication as above, the communication distance can be increased by effectively using reflection generated between the metal affixed face S and the tag antenna 151.

The second embodiment is not limited to the above but is capable of various variations within a range not departing from its technical idea and gist. The variations will be described below.

(2-1) Structure in which the Label Body is Folded in a Different Direction:

FIG. 23 is a perspective view illustrating the RFID tag (tag structure) T of this variation.

In the above embodiment, the self-supporting portion 303 of the label body 304 is consecutively installed in the tag label longitudinal direction of the affixed portion 302, but in this variation, as shown in FIG. 23, the self-supporting portion (second self-supporting portion) 303 is consecutively provided in the tag label short-side direction of the affixed portion (second affixed portion) 302, and in the RFID tag T in which the affixed portion 302 is affixed onto the affixed face, the two antennas 151 of the RFID circuit element To provided at the self-supporting portion 303 are extended while being separated from each other substantially in the horizontal direction in a state where the self-supporting portion 303 is self-supported by shape deformation by the shape memory element provided at the label body.

In this variation, too, the state where the RFID circuit element To is separated from the affixed face can be surely ensured. Also, since the antenna 151 of the RFID circuit element To is located horizontally, a projecting amount of the self-supporting portion 303 from the affixed face S can be reduced so that it does not disturb the periphery after affixation, which is advantageous.

(2-2) Structure Floated Substantially in a U-Shape:

FIG. 24A is a plan view illustrating the RFID label L of this variation and FIG. 24B is a perspective view illustrating the RFID tag T formed from the RFID label L.

In this variation, as shown in FIG. 24A, the label body 304 in the RFID label L is provided on both end sides in the tag label longitudinal direction, respectively, and is provided with two affixed portions (third affixed portions) 302 to be affixed onto the affixed face S and the self-supporting portion (third self-supporting portion) 303 provided with a separated face 303A consecutively provided in an intermediate portion between the two affixed portions 302 in the label longitudinal direction and separated from the affixed face when being self-supported by the shape-memory function of the shape-memory element 306 (See FIG. 24B). On both sides in the label longitudinal direction of the separated face 303A of the self-supporting portion 303, connection portions 303B to be connected to the affixed portion 302 are provided, and the RFID circuit element To is provided on the separated face 303A. The shape-memory element 306 is provided between each affixed portion 302 and the connection portion 303B and between the connection portion 303B and the separated face 303A of the label body 304, respectively (4 portions in total in this example).

According to this variation, the self-supporting portion 303 capable of self-support is provided with the separated face 303A separated from the affixed face in the intermediate portion of the affixed portions 302 on the label both ends and the RFID circuit element To is provided on this separated face 303A so that, as shown in FIG. 24B, the state where the RFID circuit element To is separated from the affixed face can be maintained further surely. With the structure provided with the separated face 303A, even if an external force is applied after affixation on the affixed face, proximity or contact of the RFID circuit element To provided at the separated face 303A to the affixed face can be surely prevented, which is advantageous.

In the above, the shape-memory element 306 is provided between each affixed portion 302 and the connection portion 303B and between the connection portion 303B and the separated face 303A of the label body 304, but not limited to that. That is, as shown in FIG. 25A, the shape-memory element 306 may be provided substantially in a band state over the substantially entire region in the label longitudinal direction of the label body 304 on both sides in the label width direction (upper and lower direction in the figure) with the RFID circuit element To of the label body 304 between them. In this case, the shape memory of the shape-memory element 306 is enough if the self-supporting portion 303 provided with the separated face 303A is capable of self-support in substantially the U-shape with respect to the affixed portions 302 on both ends of the label. Also, by arranging a plurality (two on both ends) of shape-memory elements 306 in this case, a force to self-support (raise) the self-supporting portion 303 becomes stronger than the case of only one element on one side and stability can be improved, which is advantageous.

Moreover, for the label body 304 with relatively wide width as shown in FIG. 25A, by arranging a plurality of shape-memory elements 306 as in the figure, while for the label body 304 with a smaller width, by arranging a single shape-memory element 306, the both cases of wide width and small width can be handled by the shape-memory element in the same structure (only by increasing/decreasing the number) and common use of the shape-memory elements can be promoted, which is advantageous.

Alternatively, as shown in FIG. 25B, the shape-memory element 306 may be provided in substantially all the regions surrounding the RFID circuit element To of the label body 304 for the similar shape memory.

In the second embodiment and all the other variations other than the above variation, as shown in FIGS. 25A and 25B, the shape-memory element 306 may be provided in substantially the band state or surrounding the RFID circuit element To on the most of the label body 304, and the same advantages can be obtained in those cases.

(2-3) In the Case of Bent and Articulated Structure:

FIG. 26A is a plan view illustrating the RFID label L of this variation and FIG. 26B is a perspective view illustrating the RFID tag T formed from the RFID label L.

In this variation, as shown in FIG. 26A, the label body 304 of the RFID label L is provided with the affixed portion (first affixed portion) 302 to be affixed onto the affixed face and the self-supporting portion (first self-supporting portion) 303 consecutively provided in the label longitudinal direction of this affixed portion 302 and self-supported with a predetermined angle to the affixed portion 302 when being self-supported by the shape-memory function of the shape-memory element 306. The self-supporting portion 303 is in a bent and articulated structure (See FIG. 26B) in which a plurality (three in this example) of faces 303a, 303b, and 303c self-supported at angles different from each other are continued.

In this example, the uppermost face 303c in the self-supporting state of the self-supporting portion 303 forms a face longer in the vertical direction in a substantially vertical attitude, and the RFID circuit element To is provided on this face 303c. The shape-memory element 306 is provided between the affixed portion 302 and the face 303a of the self-supporting portion 303, between the faces 303a and 303b, and between the faces 303b and 303c of the label body 304, respectively.

In this variation, by constituting the self-supporting portion 303 of the label body 304 in the bent and articulated structure of the plurality of faces 303a to 303c, an inclination angle can be borne by each face in a small portion, respectively, as shown in FIG. 26B (in this case, the inclination to be 90 degrees finally is borne by the faces 303a, 303b, and 303c in 30 degrees each). With the arrangement, the angle made by the affixed portion 302 and the face 303a of the self-supporting portion 303, the angle by the face 303a and the face 303b, and the angle made by the face 303b and the face 303c can be made relatively small or the angle made by the plurality of faces 303a to 303c of the self-supporting portion 303 can be made relatively small (30 degrees in this example), and thus, the shape change burden of each shape-memory element 306 can be alleviated.

(2-4) Structure of Stepped Type:

FIG. 27 is a perspective view illustrating the RFID tag T of this variation.

In the RFID tag T of this variation, in a state where the affixed portion 302 is affixed onto the affixed face, an intermediate upright portion 303C of the self-supporting portion 303 is self-supported with respect to the affixed portion 302 by shape deformation by the shape-memory element 306 provided on the label body 304, a separated face 303D consecutively provided to the intermediate upright portion 303C is further separated from the affixed face S, and the RFID circuit elements To are provided at each of the intermediate upright portion 303C and the separated face 303B.

According to the RFID tag T of this variation, since two RFID circuit elements To are provided, more information can be stored.

(2-5) Other variations:

The case where the shape-memory element 306 is provided across the self-supporting portion and the affixed portion has been described as an example, but not limited to that. That is, the element may be provided only one of the self-supporting portion or the affixed portion. For example, the shape-memory element may be fixed only on the affixed portion and a part of the shape-memory element is arranged opposite the back face side of the self-supporting portion with a predetermined gap between them, and by pushing it up in contact with the back face side of the self-supporting portion when the shape-memory element is shape-deformed so that the self-supporting portion is raised and self-supported. Similarly, when the shape-memory element is fixed only to the self-supporting portion, a part of the shape-memory element is arranged opposite the back face side of the affixed portion with a predetermined gap between them so that the self-supporting portion is raised and self-supported by pulling up the self-supporting portion in contact with the back face side of the affixed portion when the shape-memory element is shape-deformed. The same effect can be also obtained in these cases.

(3) Other notes

In the above, the print is applied on the front side of the base film layers 4a, 101b provided in the tag tape 103 in the apparatuses 100, 200, and 400 for producing RFID labels, but not limited to that. That is, the configuration of the apparatus for producing RFID labels of the present invention may be applied to a method for producing the RFID label L as described using FIG. 21 in which the print is applied on a cover film 130 separate from the tag tape 103 provided with the RFID circuit element To and they are bonded together. Moreover, the present invention is not limited to such a method in which RFID tag information is read-out from or written in the IC circuit part 150 of the RFID circuit element To and printing for identifying the RFID circuit element To is applied by the print head 105. The printing does not necessarily have to be made but the present invention may be applied to those only for reading out or writing in the RFID tag information.

Moreover, in the apparatuses 100, 200, and 400 for producing RFID labels, the case where the roll of tape with RFID tag 104 is constituted by winding the tag tape 103 around a reel member and the roll of tape with RFID tag 104 (or a cartridge provided with that) is arranged in a tag tape roll holder portion 110 and the tag tape 103 is fed out has been described as an example, but not limited to that. For example, a lengthy flat-paper state or a strip-like tape or sheet on which at least one RFID circuit element To may be arranged (including those formed by feeding out the tape wound around the roll and then, cutting it to an appropriate length) and stacked in a predetermined storage portion (flatly laminated in a tray-like container, for example) to be made into a cartridge, and the cartridge may be attached to the holder portion of the apparatuses 100, 200, and 400 for producing RFID labels and transferred and fed from the storage portion for print and writing so as to produce the RFID label L.

Moreover, there may be such configuration that the lengthy flat-paper state or strip-like tape or sheet is transferred by a predetermined feeder mechanism from outside the apparatuses 100, 200, and 400 one by one to be supplied into the apparatuses 100, 200, and 400, and not limited even to those detachably attached to the body of the apparatus for producing RFID labels such as a cartridge, the roll of tape with RFID tag 104 may be provided as so-called installed type or integral type, which is non-detachably attached to the side of the apparatus body. The same effect can be also obtained in this case.

The communication frequency (915 MHz) and the like of the radio communication used in the above shall comply with the specification formulated by EPC global. The EPC global is a non-profit corporation jointly established by International EAN Association, which is an international organization of distribution codes, and UCC (Uniformed Code Council), which is an U.S. distribution code organization. Signals complying with other standards will do as long as they serve the same functions.

Other than those mentioned above, methods of the embodiments and their variations may be combined as appropriate for use.

Though not specifically exemplified, the present invention should be put into practice with various changes made in a range not departing from its gist.

What is claimed is:

1. An RFID label comprising:
at least one RFID circuit element having an IC circuit part storing information and a tag antenna connected to said IC circuit part; and
a label main-body comprising:
said RFID circuit element; and
a stereo-structure preparation portion configured to realize a three-dimensional structure which is affixed to an affixed face, wherein
said stereo-structure preparation portion further comprising:
a folding line and a cutting line configured to realize said three-dimensional structure, and
said label main-body further comprising:
an affixed portion configured to be affixed onto said affixed face; and
a folded self-supporting portion comprising:
said RFID circuit element and configured to be self-supported with respect to said affixed face, and
said folding line comprising:
a self-support folding line configured to make said folded self-supporting portion self-supported with respect to said affixed face; and
a stable folding line configured to stabilize said self-support portion by folding said folded self-supporting portion from the vicinity of one end of said cut or said cutting line, wherein said label main-body still further comprising:
a base layer configured to arrange said RFID circuit element thereon;
an adhesive layer configured to affix said base layer to said affixed face; and
a separation material layer configured to cover said adhesive layer, and wherein
said separation material layer is cut off on said self-support folding line.

2. An RFID label comprising:
at least one RFID circuit element having an IC circuit part storing information and a tag antenna connected to said IC circuit part; and
a label main-body comprising:
said RFID circuit element; and
a stereo-structure preparation portion configured to realize a three-dimensional structure which is affixed to an affixed face, wherein
said stereo-structure preparation portion further comprising:
a folding line and a cutting line configured to realize said three-dimensional structure, and
said label main-body further comprising:
an affixed portion configured to be affixed onto said affixed face; and
a folded self-supporting portion comprising:
said RFID circuit element and configured to be self-supported with respect to said affixed face, and
said folding line comprising:
a self-support folding line configured to make said folded self-supporting portion self-supported with respect to said affixed face; and
a stable folding line configured to stabilize said self-support portion by folding said folded self-supporting portion from the vicinity of one end of said cut or said cutting line, wherein said affixed portion still further comprising:
a grounding member configured to be connected to said RFID circuit element comprised in said folded self-supporting portion across said self-support folding line.

3. An RFID label comprising:
at least one RFID circuit element having an IC circuit part storing information and a tag antenna connected to said IC circuit part; and
a label main-body comprising said RFID circuit element and including a stereo-structure preparation portion configured to realize a three- dimensional structure when being affixed to an affixed face, and
a shape-memory element configured to realize said three-dimensional structure, as said stereo-structure preparation portion, wherein:
said label main-body further comprising:
a first affixed portion configured to be affixed onto said affixed face; and
a first self-supporting portion configured to be consecutively provided in the level longitudinal direction of said first affixed portion and configured to be self-supported with a predetermined angle with respect to said first affixed portion by said shape-memory element, and wherein
said RFID circuit element is provided in said first self-supporting portion.

4. The RFID label according to claim 3, wherein:
said first self-supporting portion of said label main-body is configured to have a bent and articulated structure in which a plurality of faces self-supported with angles different from each other are continuously connected.

5. An RFID label comprising:
at least one RFID circuit element having an IC circuit part storing information and a tag antenna connected to said IC circuit part; and
a label main-body comprising:
said RFID circuit element and including a stereo-structure preparation portion configured to realize a three-dimensional structure when being affixed to an affixed face,
a shape-memory element configured to realize said three-dimensional structure, as said stereo-structure preparation portion, wherein:
said label main-body further comprising:
a second affixed portion configured to be affixed onto the affixed face; and
a second self-supporting portion configured to be consecutively provided in the label short-side direction of said second affixed portion and configured to be self-supported with an predetermined angle with respect to said second affixed portion by said shape-memory element, and wherein
said RFID circuit element is provided in said second self-supporting portion.

6. An RFID label comprising:
at least one RFID circuit element having an IC circuit part storing information and a tag antenna connected to said IC circuit part; and
a label main-body comprising:
said RFID circuit element and including a stereo-structure preparation portion configured to realize a three-dimensional structure when being affixed to an affixed face,
a shape-memory element configured to realize said three-dimensional structure,
two third affixed portions configured to be provided at both end sides in the label longitudinal direction, respectively, and configured to be affixed onto said affixed face; and
a third self-supporting portion configured to be consecutively provided in an intermediate portion in the label longitudinal direction of said two third affixed portions and configured to be self-supporting by said shape-memory element and provided with a separated face separated from said affixed face, and wherein
said RFID circuit element is provided at least on said separated face.

7. The RFID label according to claim 3, wherein:
said shape-memory element is a shape-memory alloy or shape-memory resin locally provided at a portion to be folded when a label is used, said portion including a connection portion between each affixed portion and said self-supporting portion corresponding thereto.

8. An RFID label comprising:
at least one RFID circuit element having an IC circuit part storing information and a tag antenna connected to said IC circuit part; and
a label main-body comprising:
said RFID circuit element; and
including a stereo-structure preparation portion configured to realize a three-dimensional structure which is affixed to an affixed face, wherein
a shape-memory element configured to realize said three-dimensional structure, wherein:
said label main-body comprises a laminated structure comprising:
a tape base layer substantially in a tape state;
an affixing adhesive layer configured to affix said tape base layer onto an object to be affixed;
a separation material layer configured to cover said affixed side of said affixing adhesive layer and to be separated from at an affixation;
a plurality of antenna bases substantially in a sheet state configured to be arranged on said tape base layer in its longitudinal direction with a predetermined interval and to arrange said RFID circuit element, respectively, and
a mounting adhesive layer configured to fix said plurality of antenna bases on said tape base layer.

9. The RFID label according to claim 8, wherein:
said label main-body further comprising:
a print-receiving tape layer on which a desired print is performed; and
a bonding adhesive layer configured to bond said tape base layer onto said print-receiving tape layer.

10. The RFID label according to claim 8, wherein:
said shape-memory element is a shape-memory resin provided in said antenna base or a shape-memory alloy provided in said tag antenna of said RFID circuit element.

11. The RFID label according to claim 8, wherein:
said shape-memory element is a shape-memory resin provided in said tape base layer.

12. The RFID label according to claim 10, wherein:
said shape-memory element is a shape-memory resin provided in said print-receiving tape layer.

13. The RFID label according to claim 3, wherein:
a separation distance between said affixed face and said tag antenna which is affixed onto said affixed face is set on the basis of a communication frequency of said RFID circuit element.

14. The RFID label according to claim 13, wherein:
said separation distance is set at approximately $1/12$ or more of a wavelength corresponding to said communication frequency.

15. An apparatus for producing RFID labels comprising:
a feeding device configured to feed a label medium on which a RFID circuit element provided with an IC circuit part storing information and an antenna for performing information transmission/reception is arranged;
a transmitting/receiving device configured to transmit/receive information by radio communication with said RFID circuit element; and
a stereo-structure processing device configured to realize a three-dimensional structure when being affixed onto an affixed face.

16. The apparatus for producing RFID labels according to claim 15, wherein:
said stereo-structure processing device is a line printing device configured to print a folding line or a cutting line to realize said three-dimensional structure on said label medium fed by said feeding device.

17. The apparatus for producing RFID labels according to claim 15, wherein:
said stereo-structure processing device is a cut forming device configured to form a cut for realizing said three-dimensional structure on said level medium.

18. The apparatus for producing RFID labels according to claim 16, further comprising a character/image printing device configured to print a character or image on said label medium.

19. The apparatus for producing RFID labels according to claim 18, further comprising a selecting device for an operator to select and input, whether said character or image is printed on an affixed portion to be affixed onto said affixed face or on a folded self-supporting portion to be self-supported with respect to said affixed face of said label medium, by said character/image printing device.

20. The apparatus for producing RFID labels according to claim 15, wherein:
- said feeding device feeds said label medium on which said RFID circuit element and a shape-memory element configured to realize said three-dimensional structure are arranged, and said stereo-structure processing device is a heating device configured to heat said shape-memory element to realize said three-dimensional structure.

21. An RFID label comprising:
- a label main-body configured of a tape shape;
- two self support folding lines configured to divide said label main-body into two affixed portions and a folded self-supporting portion;
- said affixed portions arranged being surrounded by some sides of said label main-body and one said self support folding line and being surrounded by some sides of said label main-body and the other said self support folding line and affixed onto an affixed face; and
- a folded self-supporting portion arranged between two self support folding lines in said label main-body and self-supported with respect to said affixed face by folding said self support folding line;
- said folded self-supporting portion having:
- two stable folding lines configured to divide said folded self-supporting portion between said two self support folding lines into three areas;
- said RFID circuit element is arranged at any of said three areas in said folded self-supporting portion.

22. An RFID label comprising:
- at least one RFID circuit element having an IC circuit part storing information and a tag antenna connected to said IC circuit part;
- a label main-body comprising:
  - said RFID circuit element, and
  - a stereo-structure preparation portion configured to realize a three-dimensional structure which is affixed to an affixed face, wherein said stereo-structure preparation portion further comprising a folding line configured to realize said three-dimensional structure and a first line along which is to be cut, configured to realize said three-dimensional structure by the folding line and the first line which is cut;
- a label main-body of a tape shape, and wherein:
  - a self support folding line divides said label main-body into an affixed portion and a folded self-supporting portion,
  - said affixed portion is surrounded by one side of said label main-body and said self support folding line in said label main-body and is affixed onto an affixed face,
  - said folded self-supporting portion is surrounded on an other side of said label main-body and said self support folding line in said label main-body and is self-supported with respect to said affixed face by folding said self support folding line,
  - said folded self-supporting portion has at least one stable folding line arranged perpendicular to said self support folding line and configured to divide said folded self-supporting portion into two areas,
  - said RFID circuit element is arranged at any of said areas, and
  - said affixed portion has at least one cutting line arranged perpendicular to said self support folding line and in extension of said stable folding line, and is configured to divide said affixed portion into two areas.

23. The RFID label according to claim 22, wherein:
- said folded self-supporting portion comprises:
- two stable folding lines configured to divide said folded self-supporting portion into three areas;
- said RFID circuit element is arranged in a middle area of said three areas in said folded self-supporting portion,
- said affixed portion having:
- two cutting lines configured to divide said affixed portion into three areas.

* * * * *